US012647358B2

(12) United States Patent
Yazawa et al.

(10) Patent No.: US 12,647,358 B2
(45) Date of Patent: Jun. 2, 2026

(54) MAC ADDRESS LEARNING IN COMMUNICATION NETWORKS

(71) Applicant: NTT, Inc., Tokyo (JP)

(72) Inventors: Go Yazawa, Musashino-shi (JP);
Takahiro Kubo, Musashino-shi (JP);
Natsuki Yasuhara, Musashino-shi (JP);
Shinichi Yoshihara, Musashino-shi (JP)

(73) Assignee: NTT, Inc., Tokyo (JP)

( * ) Notice: Subject to any disclaimer, the term of this patent is extended or adjusted under 35 U.S.C. 154(b) by 310 days.

(21) Appl. No.: 18/565,499

(22) PCT Filed: Jun. 4, 2021

(86) PCT No.: PCT/JP2021/021418
§ 371 (c)(1),
(2) Date: Nov. 29, 2023

(87) PCT Pub. No.: WO2022/254710
PCT Pub. Date: Dec. 8, 2022

(65) Prior Publication Data
US 2024/0267327 A1 Aug. 8, 2024

(51) Int. Cl.
*H04L 45/74* (2022.01)

(52) U.S. Cl.
CPC .................................... *H04L 45/74* (2013.01)

(58) Field of Classification Search
CPC ............................... H04L 45/74; H04L 12/28
See application file for complete search history.

(56) References Cited

U.S. PATENT DOCUMENTS 7,529,851 B1 * 5/2009 Haley ................. H04L 61/5092
709/224
2008/0279181 A1 11/2008 Shake et al.
(Continued)

FOREIGN PATENT DOCUMENTS

JP     2005102157 A     4/2005
JP     2007243374       9/2007
(Continued)

OTHER PUBLICATIONS

Aggarwal et al., "BGP MPLS-Based Ethernet VPN," Internet Engineering Task Force (IETF) Request for Comments: 7432, Feb. 2015, 56 pages.
(Continued)

*Primary Examiner* — Afshawn M Towfighi
(74) *Attorney, Agent, or Firm* — Fish & Richardson P.C.

(57) ABSTRACT
An information processing device according to an embodiment is a communication apparatus that is connected to a user apparatus via an access port and transmits user data from the user apparatus to another user apparatus connected to another communication apparatus via a network, and includes an acquisition function unit and an advertisement function unit. The acquisition function unit acquires a MAC address of a newly connected user apparatus in response to reception of a request for acquiring the MAC address of the user apparatus newly connected to the access port. The advertisement function unit advertises the MAC address acquired by the acquisition function unit to the other communication apparatus.

9 Claims, 17 Drawing Sheets

(56) References Cited

U.S. PATENT DOCUMENTS

| | | | | |
|---|---|---|---|---|
| 2015/0281096 A1* | 10/2015 | Boutros | ................. | H04L 47/20 |
| | | | | 370/231 |
| 2016/0044145 A1* | 2/2016 | Zhou | .................... | H04L 61/103 |
| | | | | 370/389 |
| 2017/0093834 A1* | 3/2017 | Natu | ................... | H04L 63/0272 |
| 2018/0077111 A1* | 3/2018 | Pang | ................... | H04L 61/5061 |
| 2019/0007981 A1* | 1/2019 | Furuichi | ............... | H04W 76/10 |
| 2019/0132278 A1* | 5/2019 | Mittal | ................... | H04L 61/103 |
| 2019/0305567 A1* | 10/2019 | Keeley | .................... | H01F 38/14 |
| 2020/0412640 A1 | 12/2020 | Takeshita et al. | | |

FOREIGN PATENT DOCUMENTS

| | | | | |
|---|---|---|---|---|
| JP | 201625478 | | 2/2016 | |
| JP | 2018182482 | | 11/2018 | |
| JP | 2019149772 | A | 9/2019 | |
| JP | 20205206 | | 1/2020 | |
| WO | WO 2019167703 | | 9/2019 | |
| WO | WO-2020230146 | A1 * | 11/2020 | ........... H04L 45/033 |

OTHER PUBLICATIONS

Sakagami et al., "A Study and an Evaluation on Hitless Switching Scheme for Dedicated Ethernet," IEICE Technical Report, Apr. 2013, 113(6):1-5, 11 pages (with machine translation).

* cited by examiner

Figure 4:
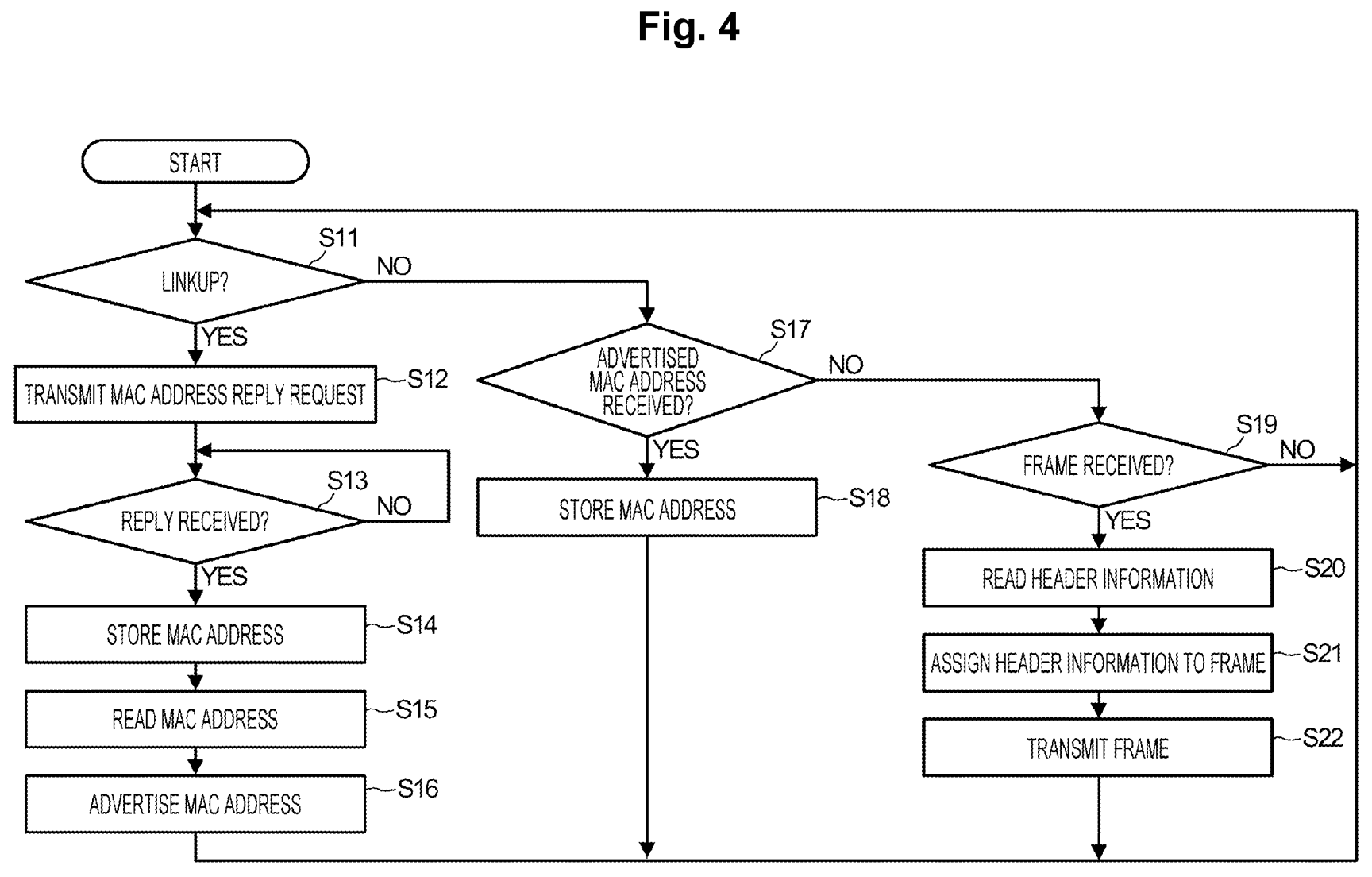

START

S11 — LINKUP?

NO →

YES ↓

S12 — TRANSMIT MAC ADDRESS REPLY REQUEST

S13 — REPLY RECEIVED?

NO

YES ↓

S14 — STORE MAC ADDRESS

S15 — READ MAC ADDRESS

S16 — ADVERTISE MAC ADDRESS

S17 — ADVERTISED MAC ADDRESS RECEIVED?

NO →

YES ↓

S18 — STORE MAC ADDRESS

S19 — FRAME RECEIVED?

NO

YES ↓

S20 — READ HEADER INFORMATION

S21 — ASSIGN HEADER INFORMATION TO FRAME

S22 — TRANSMIT FRAME

MAC ADDRESS LEARNING IN COMMUNICATION NETWORKS

CROSS-REFERENCE TO RELATED APPLICATIONS

This application is a National Stage application under 35 U.S.C. § 371 of International Application No. PCT/JP2021/021418, having an International Filing Date of Jun. 4, 2021. The disclosure of the prior application is considered part of the disclosure of this application, and is incorporated by reference in its entirety into this application.

TECHNICAL FIELD

Embodiments of this invention relate to a communication apparatus, a communication system, a communication method, and a communication program.

BACKGROUND ART

There are a certain number of users who want a network service with a short communication interruption time due to redundancy switching. For example, Non Patent Literature 1 discloses an uninterrupted redundancy switching technique as a technique for providing a network service with a short communication interruption time. Ethernet (registered trademark) is generally used as the network.

In the technique disclosed in Non Patent Literature 1, in the transmission/reception one-to-one configuration, a device (hereinafter, referred to as an uninterruptible device) that performs uninterrupted processing and is disposed at a transmission source base duplicates a user data frame, which is a transmission target, provided from a user terminal at the transmission source base. The duplicated frame is transferred from the uninterruptible device through two different routes of a relay network, and reaches an uninterruptible device disposed at a destination base. In the uninterruptible device at the destination base, one of the same frames arriving from the two routes is selected and transferred to a user terminal at the destination base.

In order to manage how far the frame has been transmitted and received in each relay network, a transmission source uninterruptible device assigns a sequence number as traffic flow management information to a frame to be duplicated. A destination uninterruptible device holds a sequence number of a frame to be processed next in the form of an expected number. When a frame with a number different from the expected number arrives, the destination uninterruptible device waits until the frame with the expected number arrives. As a result, it is possible to realize communication without skipping in the order of frames.

In not only a transmission/reception one-to-one configuration but also a one-to-n (n≥2) configuration, that is, communication between multiple bases having a plurality of reception sides, similarly, there is a demand for a network service that makes a route redundant for high reliability and switches between routes in an uninterrupted manner by using an uninterruptible device at the time of failure or the like. In the multi-base communication, it is necessary to classify the user data frame for each pair of transmission/reception devices using the uninterruptible devices on the transmission side and the reception side, and to assign a sequence number and select the user data frame for each pair. A logical classification unit by the pair of transmission/reception devices is defined as a traffic flow.

For example, in an uninterruptible device A, when a user data frame addressed to a user terminal B connected to an uninterruptible device B and a user data frame addressed to a user terminal C connected to an uninterruptible device C are received in a mixed manner from a user terminal A, the uninterruptible device A associates a pair of the uninterruptible devices as one traffic flow, assigns a sequence number to each pair, and transmits the user data frames to the network. In a network using Ethernet, a frame addressed to the user terminal B is received only by the uninterruptible device B and a frame addressed to the user terminal C is received only by the uninterruptible device C through MAC address learning at a network switch by the network switch disposed in the network.

In this case, in the uninterruptible device on the transmission side, it is necessary to determine the transmission destination uninterruptible device from the MAC address of the transmission destination user terminal and classify the traffic flow. Therefore, the uninterruptible device on the transmission side needs to learn the MAC address of the transmission destination user terminal and transmission destination uninterruptible device in association with each other.

As a method of this learning, for example, it is conceivable to exchange the MAC address of the transmission destination user terminal between the uninterruptible devices by utilizing a MAC address exchange method used for Ethernet VPN (EVPN) as disclosed in Non Patent Literature 2. The EVPN is a technology for realizing an Ethernet VPN (L2) in an IP (L3) network. In the EVPN, a provider edge (PE) performs MAC address learning when receiving a signal from a local customer edge (CE), and advertises a MAC/IP Route in the form of Route Type 2 (MAC/IP Advertisement Route) to another PE. Then, the PE that has received the MAC/IP Route performs MAC address learning for the CE connected to the PE other than the own apparatus on the basis of the MAC/IP Route.

CITATION LIST

Non Patent Literature

Non Patent Literature 1: Sakagami et al., "A Study and an Evaluation on Hitless Switching Scheme for Dedicated Ethernet", IEICE Technical Report, IEICE Technical Report, CS201-1 (2013-04)

Non Patent Literature 2: rfc7432 "BGP MPLS-Based Ethernet VPN"

SUMMARY OF INVENTION

Technical Problem

In the EVPN, the PE advertises the MAC address in response to signal transmission from the local CE. Therefore, when the local CE of the PE has never performed signal transmission, that is, has not advertised the MAC address at the timing when communication is to be started at another PE, the MAC address is unlearned at the other PE, and communication cannot be started.

Thus, not limited to the uninterrupted redundancy switching technique between multiple bases and the EVPN, in a network in which a MAC address is shared between nodes, there is a demand for a technology that ensures that a transmission source node completes MAC address learning for a transmission destination node at a time point when communication between nodes is to be started.

This invention is to provide a technology that enables MAC address learning to be performed at an appropriate time point.

Solution to Problem

In order to solve the above problem, a communication apparatus according to an aspect of this invention is a communication apparatus that is connected to a user apparatus via an access port and transmits user data from the user apparatus to another user apparatus connected to another communication apparatus via a network, and includes an acquisition function unit and an advertisement function unit. The acquisition function unit acquires a MAC address of a newly connected user apparatus in response to reception of a request for acquiring the MAC address of the user apparatus newly connected to the access port. The advertisement function unit advertises the MAC address acquired by the acquisition function unit to the other communication apparatus.

Advantageous Effects of Invention

According to an aspect of this invention, the communication apparatus can cause the other communication apparatus to perform MAC address learning by advertising the MAC address of the user apparatus newly connected to the access port in response to the reception of a request for acquiring the MAC address of the user apparatus. Thus, it is possible to provide a technology that enables MAC address learning to be performed at an appropriate time point.

BRIEF DESCRIPTION OF DRAWINGS

FIG. 3 is a block diagram illustrating an example of a functional configuration of the communication apparatus according to the first embodiment.

FIG. 4 is a flowchart illustrating an example of an operation of the communication apparatus according to the first embodiment.

FIG. 7 is a flowchart illustrating an example of an operation of the communication apparatus according to the second embodiment.

FIG. 11 is a block diagram illustrating an example of a configuration of a communication apparatus according to a fourth embodiment of this invention.

DESCRIPTION OF EMBODIMENTS

Hereinafter, embodiments according to this invention will be described with reference to the drawings.

First Embodiment (Configuration)

Figure 1:
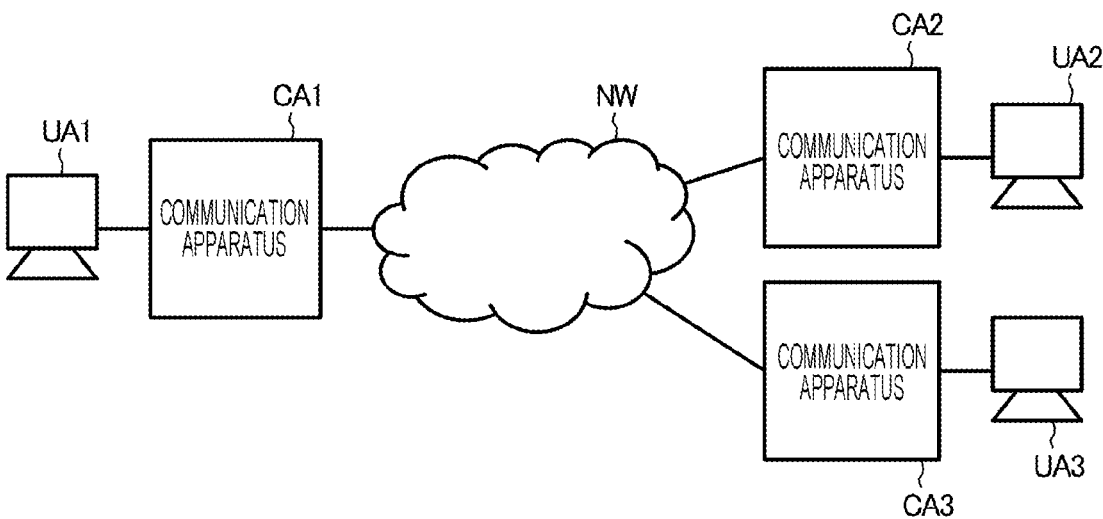
FIG. 1 is a schematic diagram illustrating a communication system to which a communication apparatus according to a first embodiment of this invention is applied.

FIG. 1 is a schematic diagram illustrating a communication system to which a communication apparatus according to the first embodiment of this invention is applied.

The communication system includes first to third communication apparatuses CA1, CA2, and CA3 connected to each other via a network NW. Hereinafter, the first to third communication apparatuses CA1, CA2, and CA3 will be referred to as a communication apparatus CA in a case where it is not particularly necessary to distinguish them. The communication apparatus CA is the communication apparatus according to the first embodiment. Note that the communication apparatus may function as a transmission device in the communication system or may function as a reception device.

A first user apparatus UA1 is connected to a first communication apparatus CA1, a second user apparatus UA2 is connected to a second communication apparatus CA2, and a third user apparatus UA3 is connected to a third communication apparatus CA3. Hereinafter, the first to third user apparatuses UA1, UA2, and UA3 will be referred to as a user apparatus UA in a case where it is not particularly necessary to distinguish them.

Figure 2:
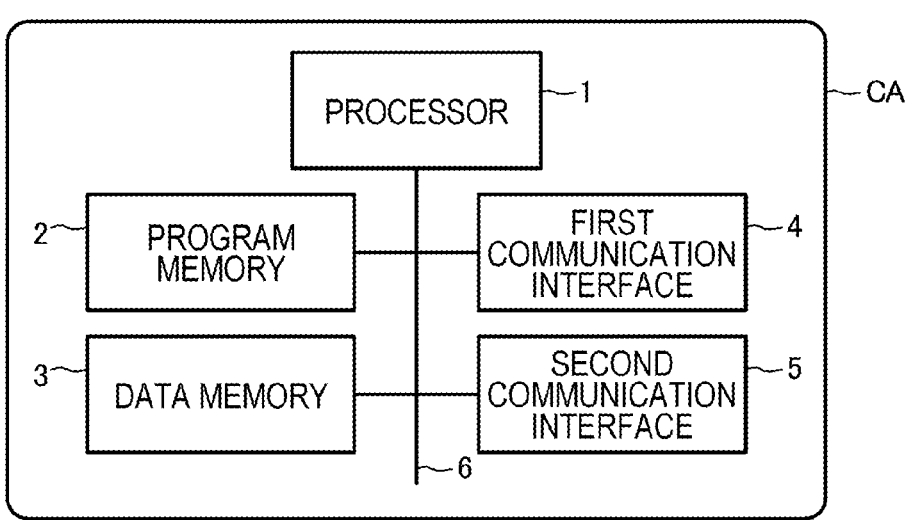
FIG. 2 is a diagram illustrating an example of a hardware configuration of a computer in a case where the communication apparatus according to the first embodiment is configured by the computer.

FIG. 2 is a diagram illustrating an example of a hardware configuration of a computer in a case where the communication apparatus CA according to the first embodiment is configured by the computer. The communication apparatus CA includes a hardware processor 1 such as a central processing unit (CPU). Then, in the communication apparatus CA, a program memory 2, a data memory 3, a first communication interface 4, and a second communication interface 5 are connected to the processor 1 via a bus 6. Note that the CPU can simultaneously execute a plurality of pieces of information processing by using a multi-core and multi-thread one. Further, the processor 1 may include a plurality of CPUs.

The program memory 2 is a non-transitory tangible computer readable storage medium in which a non-volatile memory capable of writing and reading at any time, such as a hard disk drive (HDD) or a solid state drive (SSD), and a non-volatile memory such as a read only memory (ROM) are used in combination. The program memory 2 stores a communication program necessary for the processor 1 to execute various types of control processing according to the present embodiment.

The data memory 3 is a tangible computer readable storage medium in which, for example, the above non-volatile memory and a volatile memory such as a random access memory (RAM) are used in combination. The data memory 3 is used to store various types of data acquired and created in the process of performing the various types of processing. That is, in the data memory 3, an area for storing various types of data is appropriately secured in the process of performing the various types of processing.

The first communication interface 4 includes an access port to which the user apparatus UA can be connected, and transmits and receives a control signal and user data to and from the user apparatus UA.

The second communication interface 5 includes a wide area network (WAN) port for connecting to the network NW, and a communication module according to a communication medium, a communication method, and a communication protocol of the network NW, and transmits a control signal and user data to and from another communication apparatus CA via the network NW.

Figure 3:
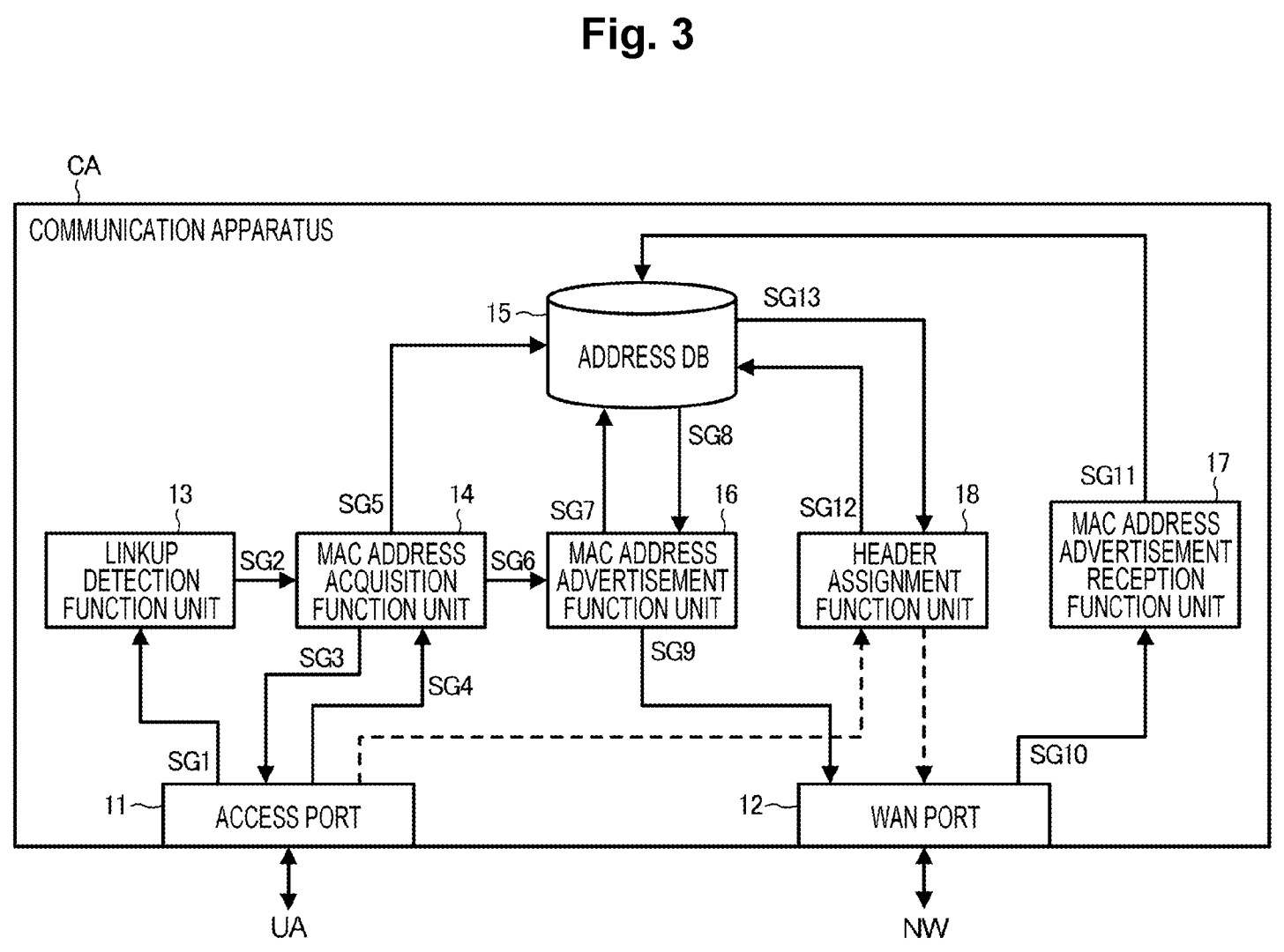

FIG. 3 is a block diagram illustrating an example of a functional configuration of the communication apparatus CA according to the first embodiment. Note that FIG. 3 illustrates only function units related to transmission of the user data from the user apparatus UA. That is, since the function units related to reception of the user data transmitted from the other communication apparatus CA via the network NW are similar to those of a conventional communication apparatus, illustration and description thereof are omitted.

As illustrated in FIG. 3, the communication apparatus CA includes an access port 11, a WAN port 12, a linkup detection function unit 13, a MAC address acquisition function unit 14, an address database (in FIG. 3, referred to as an address DB) 15, a MAC address advertisement function unit 16, a MAC address advertisement reception function unit 17, and a header assignment function unit 18. Note that, in FIG. 3, the solid arrows indicate a flow of a control signal between the function units, and the broken arrows indicate a flow of user data, which is a transmission target.

The access port 11 is a port of the above first communication interface 4 for exchanging the control signal and the user data with the user apparatus UA. Further, the WAN port 12 is a port of the above second communication interface 5 for exchanging the control signal and the user data with the other communication apparatus CA via the network NW.

The linkup detection function unit 13 receives a link state signal SG1 indicating the link state of the access port 11, and detects linkup in which the user apparatus UA is newly connected to the access port 11 and brought into a communicable state according to the link state signal SG1. Then, the linkup detection function unit 13 transmits an acquisition request signal SG2 requesting acquisition of the MAC address to the MAC address acquisition function unit 14 at the timing of linked-up.

In response to receiving the acquisition request signal SG2, the MAC address acquisition function unit 14 transmits a MAC address reply request signal SG3 requesting acquisition and reply of the MAC address to the user apparatus UA via the access port 11. Then, the MAC address acquisition function unit 14 receives a MAC address reply signal SG4 indicating the MAC address of the user apparatus UA replied from the user apparatus UA via the access port 11. For example, the MAC address acquisition function unit 14 can transmit an address resolution protocol (ARP) to the user apparatus UA and read a transmission source MAC address in a loopback signal from the user apparatus UA. In this way, the MAC address acquisition function unit 14 can acquire the MAC address of the user apparatus UA. The MAC address acquisition function unit 14 transmits the acquired MAC address to the address database 15 using a MAC address notification signal SG5, and transmits a MAC address acquisition completion notification signal SG6 indicating completion of acquisition of the MAC address to the MAC address advertisement function unit 16.

The address database 15 is a MAC address database that accumulates the acquired MAC address indicated by the MAC address notification signal SG5 transmitted from the MAC address acquisition function unit 14. Further, the address database 15 accumulates a device ID, which is information for identifying the other communication apparatus CA connectable via the network NW, and the MAC address of the user apparatus UA connected to the communication apparatus CA in a pair.

Upon receiving the MAC address acquisition completion notification signal SG6 from the MAC address acquisition function unit 14, the MAC address advertisement function unit 16 transmits a MAC address read request signal SG7 for requesting reading of the MAC address to the address database 15. In response to the MAC address read request signal SG7, the address database 15 returns a MAC address notification signal SG8 indicating the accumulated MAC address to the MAC address advertisement function unit 16. In this way, the MAC address advertisement function unit 16 can read the MAC address from the address database 15. Then, the MAC address advertisement function unit 16 transmits a MAC address advertisement signal SG9 indicating the read MAC address and the device ID of the communication apparatus CA to the WAN port 12. As a result, the MAC address advertisement function unit 16 can advertise the MAC address of the user apparatus UA connected to the communication apparatus CA to the other communication apparatus CA via the WAN port 12.

Upon receiving the MAC address advertised by the other communication apparatus CA, the WAN port 12 transmits a MAC address advertisement information signal SG10 indicating the received MAC address and the device ID of the communication apparatus CA to the MAC address advertisement reception function unit 17. The MAC address advertisement reception function unit 17 pairs the device ID of the other communication apparatus CA and the MAC address included in the MAC address advertisement information signal SG10, and transmits the pair to the address database 15 using a MAC address advertisement information notification signal SG11. The address database 15 accumulates the pair of the device ID and the MAC address indicated by the MAC address advertisement information notification signal SG11. In this way, the MAC address advertisement reception function unit 17 can acquire the pair of the device ID of the other communication apparatus CA and the MAC address of the user apparatus UA connected thereto, and register the pair in the address database 15, that is, perform the MAC address learning.

The header assignment function unit 18 receives the user data, for example, the user data frame from the user apparatus UA through the access port 11. The user data frame includes a header and a data payload. The header assignment function unit 18 acquires transmission destination information from the header of the user data frame. The transmission destination information is, for example, a MAC address of the transmission destination user apparatus UA. Then, the header assignment function unit 18 transmits a header information read request signal SG12 including the MAC address of the transmission destination user apparatus UA to the address database 15. The address database 15 returns a pair of the MAC address corresponding to the MAC address included in the header information read request signal SG12 and the device ID of the communication apparatus CA to the header assignment function unit 18 as a header information notification signal SG13. The header assignment function unit 18 creates the header information of the user data frame to be transmitted on the basis of the device ID of the communication apparatus CA indicated by the header information notification signal SG13 and adds the header information to the user data frame. Then, the header assignment function unit 18 transfers the user data frame to which the header information has been assigned to the WAN port 12, unicasts the user data frame from the WAN port 12, and transmits the user data frame to the communication apparatus CA corresponding to the destination user apparatus UA.

All of the linkup detection function unit 13, the MAC address acquisition function unit 14, the MAC address advertisement function unit 16, the MAC address advertisement reception function unit 17, and the header assignment function unit 18 are realized by causing the processor 1 to read and execute the communication program stored in the program memory 2. Note that some or all of these processing function units may be implemented in other various forms including an integrated circuit such as an application specific integrated circuit (ASIC) or a field-programmable gate array (FPGA). Further, the address database 15 can be configured in the data memory 3.

(Operation)

Next, the operation of the communication apparatus CA according to the first embodiment will be described.

FIG. 4 is a flowchart illustrating an example of an operation of the communication apparatus CA according to the first embodiment. In a case where the communication apparatus CA is configured by a computer as illustrated in FIG. 2, the program memory 2 stores a communication program necessary for executing the control processing illustrated in this flowchart, and when the processor 1 executes the communication program, the processor 1 can operate as each function unit of the communication apparatus CA illustrated in FIG. 3.

The processor 1 functions as the linkup detection function unit 13, and determines whether or not the linkup of the connection of a new user apparatus UA is detected according to the link state signal SG1 from the access port 11 of the first communication interface 4 (step S11).

When determining that the linkup is detected (YES in step S11), the processor 1 executes the processing operation as the MAC address acquisition function unit 14. That is, the processor 1 transmits the MAC address reply request from the access port 11 of the first communication interface 4 to the linked-up user apparatus UA (step S12). Then, the processor 1 determines whether or not a reply from the user apparatus UA is received by the access port 11 (step S13). In a case where it is determined that a reply from the user apparatus UA has not been received (NO in step S13), the processor 1 executes the processing operation of this step S13 again. In this way, the processor 1 waits to receive a reply from the user apparatus UA.

Then, when determining that the reply from the user apparatus UA has been received (YES in step S13), the processor 1 pairs the received MAC address of the user apparatus UA with the device ID of the communication apparatus CA, and stores the pair in the address database 15 (step S14).

Thereafter, the processor 1 functions as the MAC address advertisement function unit 16 and reads the MAC address paired with the device ID from the address database 15 (step S15). Then, the processor 1 advertises the read MAC address and the device ID onto the network NW from the WAN port 12 of the second communication interface 5 (step S16). As a result, the processor 1 can transmit the MAC address of the user apparatus UA newly connected to the communication apparatus CA to the other communication apparatus CA. Thereafter, the processor 1 proceeds to the processing operation of step S11 described above.

Further, in step S11 described above, when determining that the linkup is not detected (NO in step S11), the processor 1 executes the processing operation as the MAC address advertisement reception function unit 17. That is, the processor 1 determines whether or not the MAC address advertised by the other communication apparatus CA has been received according to the MAC address advertisement information signal SG10 from the WAN port 12 of the second communication interface 5 (step S17). When determining that the MAC address advertised by the other communication apparatus CA has been received (YES in step S17), the processor 1 pairs the received MAC address with the device ID advertised together with the MAC address, and stores the pair in the address database 15 (step S18). In this way, when the new user apparatus UA is connected to the other communication apparatus CA, that is, in response to new installation of the user apparatus UA, the processor 1 can learn the device ID of the communication apparatus CA and the MAC address of the newly connected user apparatus UA. Thereafter, the processor 1 proceeds to the processing operation of step S11 described above.

Further, in step S17 described above, when determining that the MAC address advertised by the other communication apparatus CA has not been received (NO in step S17), the processor 1 executes the processing operation as the header assignment function unit 18. That is, the processor 1 determines whether or not the user data frame from the user apparatus UA has been received through the access port 11 of the first communication interface 4 (step S19). In a case where it is determined that the user data frame has not been received (NO in step S19), the processor 1 proceeds to the processing operation of step S11 described above.

On the other hand, when determining that the user data frame has been received (YES in step S19), the processor 1 acquires the MAC address of the transmission destination user apparatus UA, which is the transmission destination information, from the user data frame, and reads the header information corresponding to the MAC address from the address database 15 (step S20). This read header information is a pair of the MAC address and the device ID of the communication apparatus CA. The processor 1 assigns the read header information to the user data frame (step S21). Then, the processor 1 unicasts the user data frame to which the header information has been assigned to the WAN port 12 of the second communication interface 5, and transmits the user data frame to the communication apparatus CA corresponding to the destination user apparatus UA (step S22). Thereafter, the processor 1 proceeds to the processing operation of step S11 described above.

Since the processing operation related to reception of the user data transmitted from the other communication apparatus CA via the network NW is similar to that of a conventional communication apparatus, illustration and description thereof are omitted.

In the first embodiment as described above, for example, when the third user apparatus UA3 is newly installed with respect to the third communication apparatus CA3, the third communication apparatus CA3 detects the linkup of the third user apparatus UA3 and requests a reply of the MAC address to the third user apparatus UA3. Then, the third communication apparatus CA3 acquires the MAC address from the reply from the third user apparatus UA3, and advertises the MAC address to the other communication apparatus CA. As a result, the first and second communication apparatuses CA1 and CA2 can learn the MAC address of the third user apparatus UA3 newly installed for the third communication apparatus CA3.

As described above, the communication apparatus CA according to the first embodiment is a communication apparatus that is connected to the user apparatus UA via the access port 11 and transmits the user data from the user apparatus UA to another user apparatus UA connected to another communication apparatus CA via the network NW, and includes the MAC address acquisition function unit 14, which is an acquisition function unit, that acquires the MAC address of the newly connected user apparatus UA in response to reception of a request for acquiring the MAC address of the user apparatus UA newly connected to the access port 11, and the MAC address advertisement function unit 16, which is an advertisement function unit, that advertises the MAC address acquired by the MAC address acquisition function unit 14 to the other communication apparatus CA. As described above, the communication apparatus CA causes the other communication apparatus CA to perform MAC address learning by advertising the MAC address of the user apparatus UA newly connected to the access port 11 in response to the reception of a request for acquiring the MAC address of the user apparatus UA. Thus, in the other communication apparatus CA, the MAC address learning can be performed for the newly installed user apparatus UA before the time point when the MAC address is required, that is, at an appropriate time point.

Note that the communication apparatus CA further includes the linkup detection function unit 13 that detects the linkup of the access port 11, and transmits the acquisition request signal SG2 as a request for acquiring the MAC address of the newly connected user apparatus UA described above to the MAC address acquisition function unit 14 in response to the linkup of the access port 11. As described above, the communication apparatus CA can actively acquire the MAC address in response to the new installation of the user apparatus UA and advertise the MAC address to the other communication apparatus CA. Thus, in the other communication apparatus CA, the MAC address learning can be performed for the newly installed user apparatus UA before the time point when the MAC address is required, that is, at an appropriate time point.

Second Embodiment

Next, the second embodiment of this invention will be described. In the description of the second embodiment, the same configurations and processing operations as those of the first embodiment described above are denoted by the same reference numerals as those used in the description of the first embodiment described above, and the description thereof will be omitted.

(Configuration)

Figure 5:
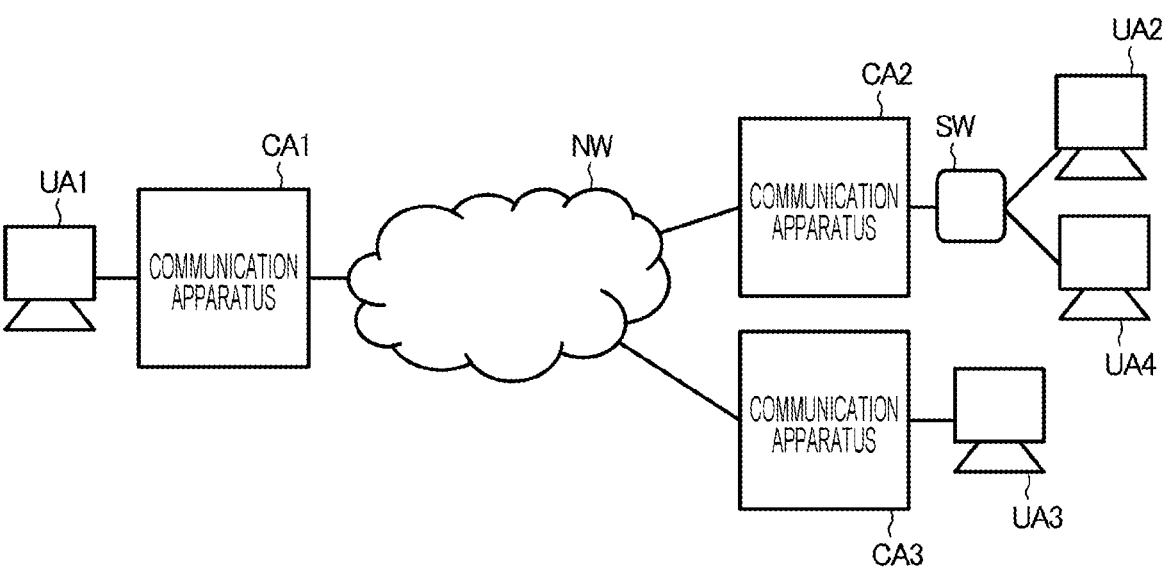
FIG. 5 is a schematic diagram illustrating a communication system to which a communication apparatus according to a second embodiment of this invention is applied.

FIG. 5 is a schematic diagram illustrating a communication system to which a communication apparatus according to the second embodiment of this invention is applied. This communication system is configured such that the second user apparatus UA2 and a fourth user apparatus UA4 are connected to the second communication apparatus CA2 via a switch SW.

In the first embodiment described above, in the communication apparatus CA, new installation of the user apparatus UA is determined in response to the linkup of the access port 11. However, when the communication apparatus CA and the user apparatus UA are connected via the switch SW, the access port 11 is always in a linked-up state with respect to the switch SW regardless of the presence or absence of the user apparatus UA. Therefore, the communication apparatus CA cannot determine the new installation of the user apparatus UA.

Figure 6:
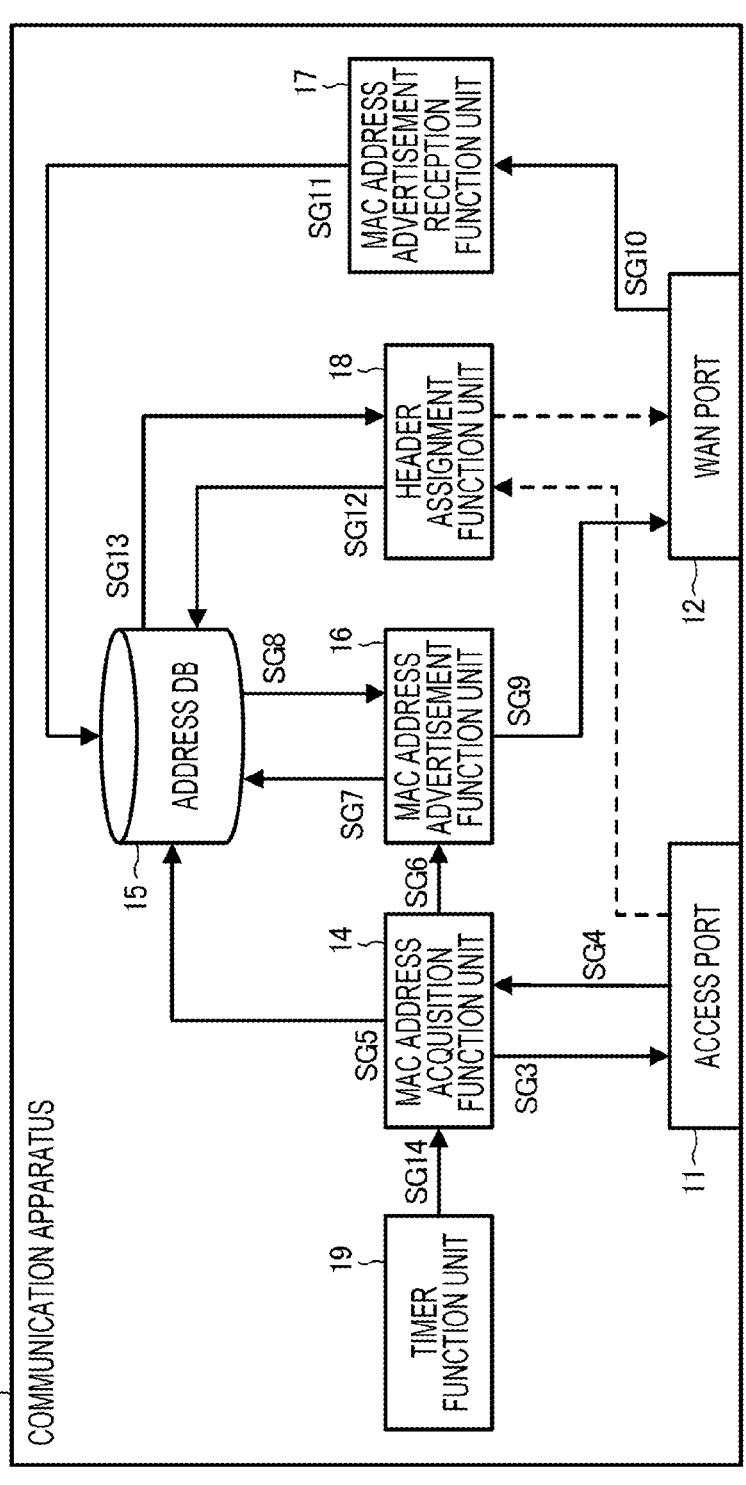
FIG. 6 is a block diagram illustrating an example of a configuration of the communication apparatus according to the second embodiment.

FIG. 6 is a block diagram illustrating an example of a configuration of the communication apparatus CA according to the second embodiment to deal with such a case. The communication apparatus CA includes a timer function unit 19 as illustrated in FIG. 6 instead of the linkup detection function unit 13 in the first embodiment.

The timer function unit 19 clocks a predetermined fixed time, and every time the fixed time elapses, transmits a timing notification signal SG14 indicating that it is time to acquire the MAC address to the MAC address acquisition function unit 14. The fixed time is time set for periodically attempting to acquire the MAC address of the newly installed user apparatus UA.

In response to receiving the timing notification signal SG14, the MAC address acquisition function unit 14 transmits the MAC address reply request signal SG3 requesting acquisition and reply of the MAC address to the user apparatus UA via the access port 11. Then, the MAC address acquisition function unit 14 receives the MAC address reply signal SG4 indicating the MAC address of the user apparatus UA replied from the user apparatus UA via the access port 11. For example, the MAC address acquisition function unit 14 can transmit an Ether OAM (Ether-LinkTrace (LT)) to the user apparatus UA and read a transmission source MAC address in a loopback signal from the user apparatus UA. In this way, the MAC address acquisition function unit 14 can acquire the MAC address of the user apparatus UA.

(Operation)

Next, the operation of the communication apparatus CA according to the second embodiment will be described.

Figure 7:
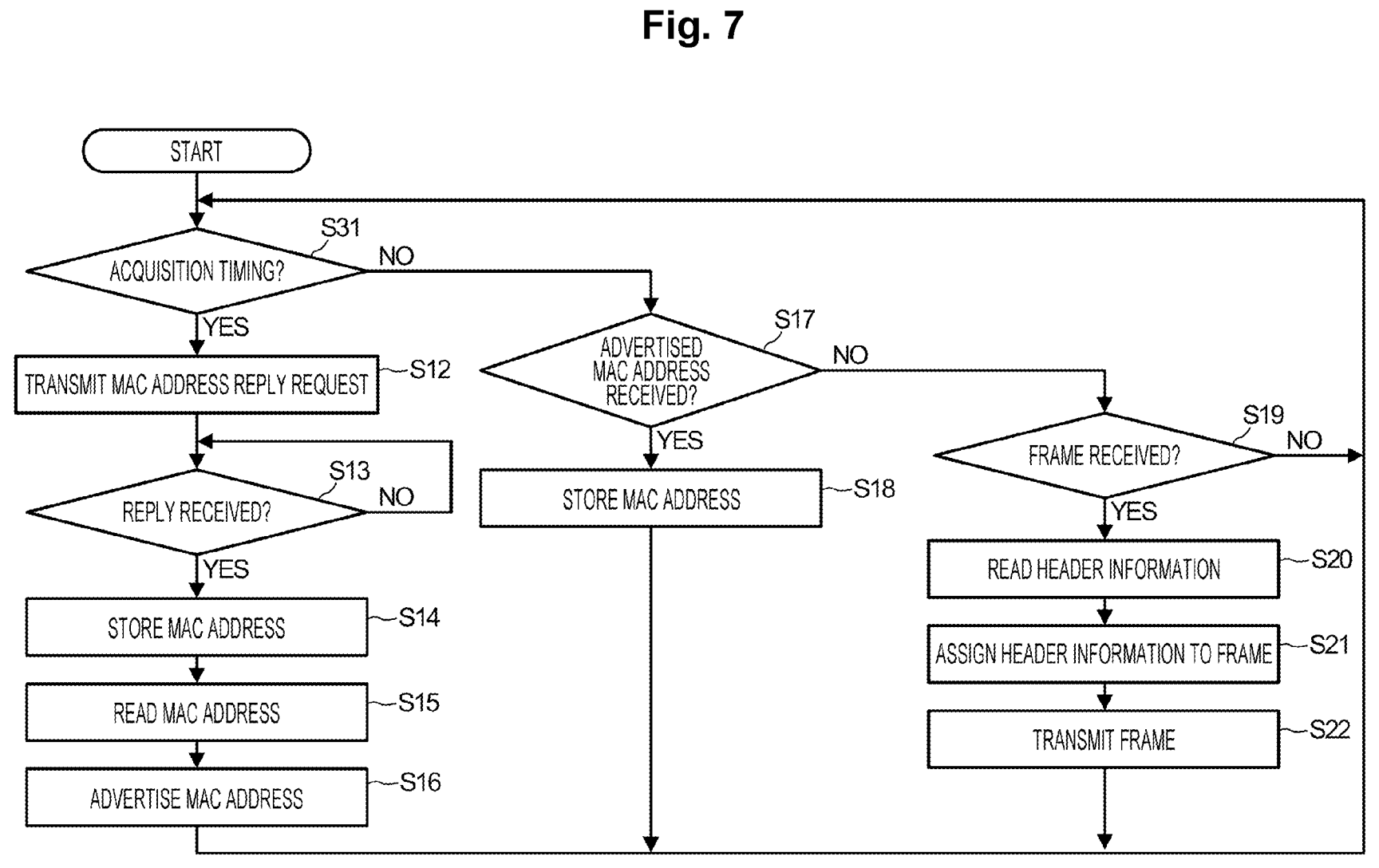

FIG. 7 is a flowchart illustrating an example of an operation of the communication apparatus CA according to the second embodiment.

In the second embodiment, the processor 1 determines whether or not it is a regular MAC address acquisition timing clocked by the timer function unit 19 (step S31). When determining that it is not the timing to acquire the MAC address (NO in step S31), the processor 1 proceeds to the processing operation of step S17 described above, and determines whether or not the MAC address advertised by the other communication apparatus CA has been received.

On the other hand, when determining that it is time to acquire the MAC address (YES in step S31), the processor 1 transmits a MAC address reply request from the access port 11 of the first communication interface 4 (step S12). In this case, in the present embodiment, the MAC address reply request is transmitted to the user apparatus UA via the switch SW by polling. Then, the processor 1 proceeds to the processing operation of step S13 described above, and waits for reception of a reply from the newly installed user apparatus UA.

In the second embodiment as described above, for example, the second communication apparatus CA2 requests the user apparatus UA to reply with the MAC address by periodic polling. Then, the second communication apparatus CA2 acquires the MAC address using the reply from, for example, the newly installed fourth user apparatus UA4, and advertises the MAC address to the other communication apparatus CA. As a result, the first and third communication apparatuses CA1 and CA3 can learn the MAC address of the fourth user apparatus UA4 newly installed with respect to the second communication apparatus CA2.

As described above, the communication apparatus CA according to the second embodiment includes the timer function unit 19 that clocks time and sends the timing notification signal SG14 as a request for acquiring the MAC address of the newly connected user apparatus UA to the MAC address acquisition function unit 14 every time a fixed time elapses. As described above, the communication apparatus CA can actively acquire the MAC address of the newly installed user apparatus UA by periodically polling for the presence or absence of the newly installed user apparatus UA, and advertise the MAC address to the other communication apparatus CA, that is, periodically transmit the MAC address reply request from the access port 11. Thus, in the other communication apparatus CA, the MAC address learning can be performed for the newly installed user apparatus UA before the time point when the MAC address is required, that is, at an appropriate time point.

Third Embodiment

Next, the third embodiment of this invention will be described. In the description of the third embodiment, the same configurations and processing operations as those of the first embodiment described above are denoted by the same reference numerals as those used in the description of the first embodiment described above, and the description thereof will be omitted.

(Configuration)

A communication system to which the communication apparatus according to the third embodiment of this invention is applied is, for example, a communication system described in the second embodiment illustrated in FIG. 5.

Figure 8:
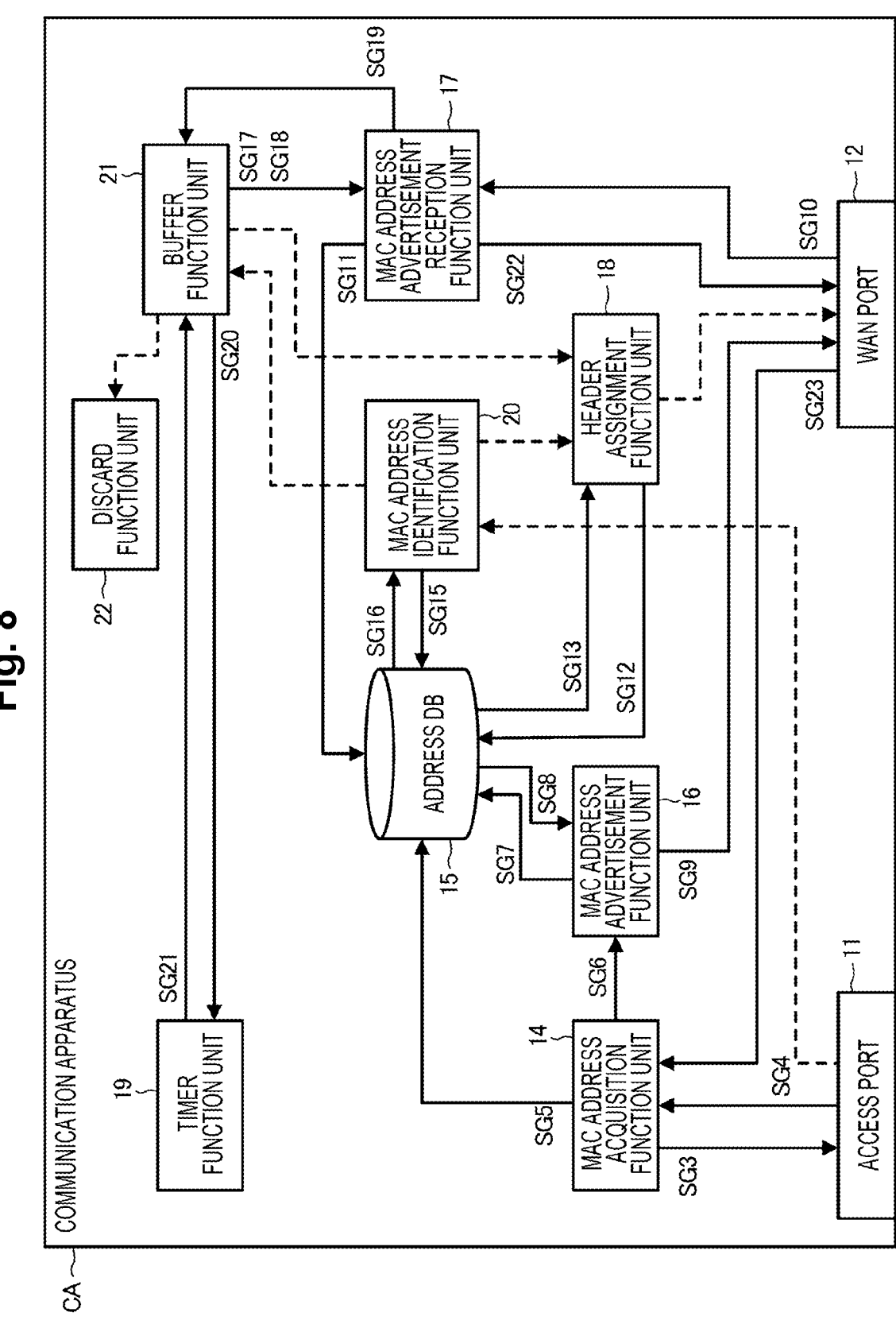
FIG. 8 is a block diagram illustrating an example of a configuration of a communication apparatus according to a third embodiment of this invention.

FIG. 8 is a block diagram illustrating an example of a configuration of a communication apparatus CA according to the third embodiment of this invention. The communication apparatus CA includes the timer function unit 19, a MAC address identification function unit 20, a buffer function unit 21, and a discard function unit 22 as illustrated in FIG. 6 instead of the linkup detection function unit 13 in the first embodiment.

The MAC address identification function unit 20 receives the user data frame from the user apparatus UA through the access port 11. Then, the MAC address identification function unit 20 extracts the transmission destination MAC address from the user data frame, and transmits a MAC address read request signal SG15 for requesting reading of the MAC address corresponding to the transmission destination MAC address to the address database 15. In response to the MAC address read request signal SG15, the address database 15 returns a MAC address notification signal SG16 indicating the accumulated MAC address to the MAC address identification function unit 20. The MAC address identification function unit 20 can determine whether or not the transmission destination MAC address is learned in the address database 15 according to the MAC address notification signal SG16. When determining that the transmission destination MAC address has been learned, the MAC address identification function unit 20 transmits the received user data frame to the header assignment function unit 18. On the other hand, when determining that the transmission destination MAC address is unlearned, the MAC address identification function unit 20 transmits the received user data frame to the buffer function unit 21.

When receiving the user data frame, the buffer function unit 21 buffers the user data frame. For example, it is stored in a temporary storage area provided in the data memory 3. Then, the buffer function unit 21 extracts the transmission destination MAC address from the user data frame, and transmits an inquiry request signal SG17 for inquiring about the presence or absence of new installation of the user apparatus UA, and a MAC address notification signal SG18 indicating the transmission destination MAC address to the MAC address advertisement reception function unit 17. Further, when receiving an inquiry result signal SG19 indicating the presence of new installation of the user apparatus UA from the MAC address advertisement reception function unit 17, the MAC address identification function unit 20 transmits the buffered user data frame to the header assignment function unit 18.

The buffer function unit 21 further transmits a count start request signal SG20 for requesting start of counting to the timer function unit 19 at the same time as the transmission of the inquiry request signal SG17 described above. The timer function unit 19 starts clocking upon the reception of the count start request signal SG20, and returns a count end notification signal SG21 indicating that a predetermined standby time has been clocked to the buffer function unit 21. When the inquiry result signal SG19 is not yet received from the MAC address advertisement reception function unit 17 at the timing when the count end notification signal SG21 is received, the buffer function unit 21 transmits the buffered user data frame to the discard function unit 22. The discard function unit 22 discards the received user data frame.

In response to the inquiry request signal SG17 from the buffer function unit 21, the MAC address advertisement reception function unit 17 transmits a MAC address advertisement request signal SG22 for requesting advertisement of a new MAC address to the WAN port 12. As a result, the MAC address advertisement reception function unit 17 can request advertisement of the MAC address of the user apparatus UA newly installed for the other communication apparatuses CA to the communication apparatuses CA via the WAN port 12.

Further, in the present embodiment, when receiving the request for the MAC address advertisement transmitted by the other communication apparatus CA, the WAN port 12 transmits a MAC address advertisement request signal SG23 indicating that such a request has been received to the MAC address acquisition function unit 14. In response to reception of the MAC address advertisement request signal SG23, the MAC address acquisition function unit 14 transmits the MAC address reply request signal SG3 requesting acquisition and reply of the MAC address to the user apparatus UA via the access port 11 as described in the second embodiment. Then, the MAC address acquisition function unit 14 receives the MAC address reply signal SG4 indicating the MAC address of the user apparatus UA replied from the user apparatus UA via the access port 11.

Then, the MAC address acquisition function unit 14, the address database 15, and the MAC address advertisement function unit 16 operate as described in the first embodiment described above. As a result, the MAC address advertisement function unit 16 can transmit the MAC address advertisement signal SG9 to the WAN port 12, and advertise the new MAC address of the user apparatus UA newly installed for the communication apparatus CA to the other communication apparatus CA via the WAN port 12.

The MAC address advertisement reception function unit 17 receives the MAC address advertisement information signal SG10 indicating the new MAC address advertised by the other communication apparatus CA from the WAN port 12. The MAC address advertisement reception function unit 17 determines whether the MAC address included in the MAC address advertisement information signal SG10 matches the MAC address for which an inquiry has been made. Then, in a case of matching, the MAC address advertisement reception function unit 17 transmits the inquiry result signal SG19 indicating the presence of new installation of the user apparatus UA to the buffer function unit 21. Further, in this case, the MAC address advertisement reception function unit 17 transmits the MAC address advertisement information notification signal SG11 indicating the content of the received MAC address advertisement information to the address database 15. As a result, the communication apparatus CA can perform MAC address learning for the user apparatus UA newly installed for the other communication apparatus CA.

The header assignment function unit 18 reads the header information of the communication apparatus CA corresponding to the transmission destination MAC address of the user data frame transmitted from the MAC address identification function unit 20 from the address database 15 as described in the first embodiment. Then, the header assignment function unit 18 can assign the header to the user data frame on the basis of the read header information and transfer the user data frame to the WAN port 12.

(Operation)

Next, the operation of the communication apparatus CA according to the third embodiment will be described.

Figure 9:
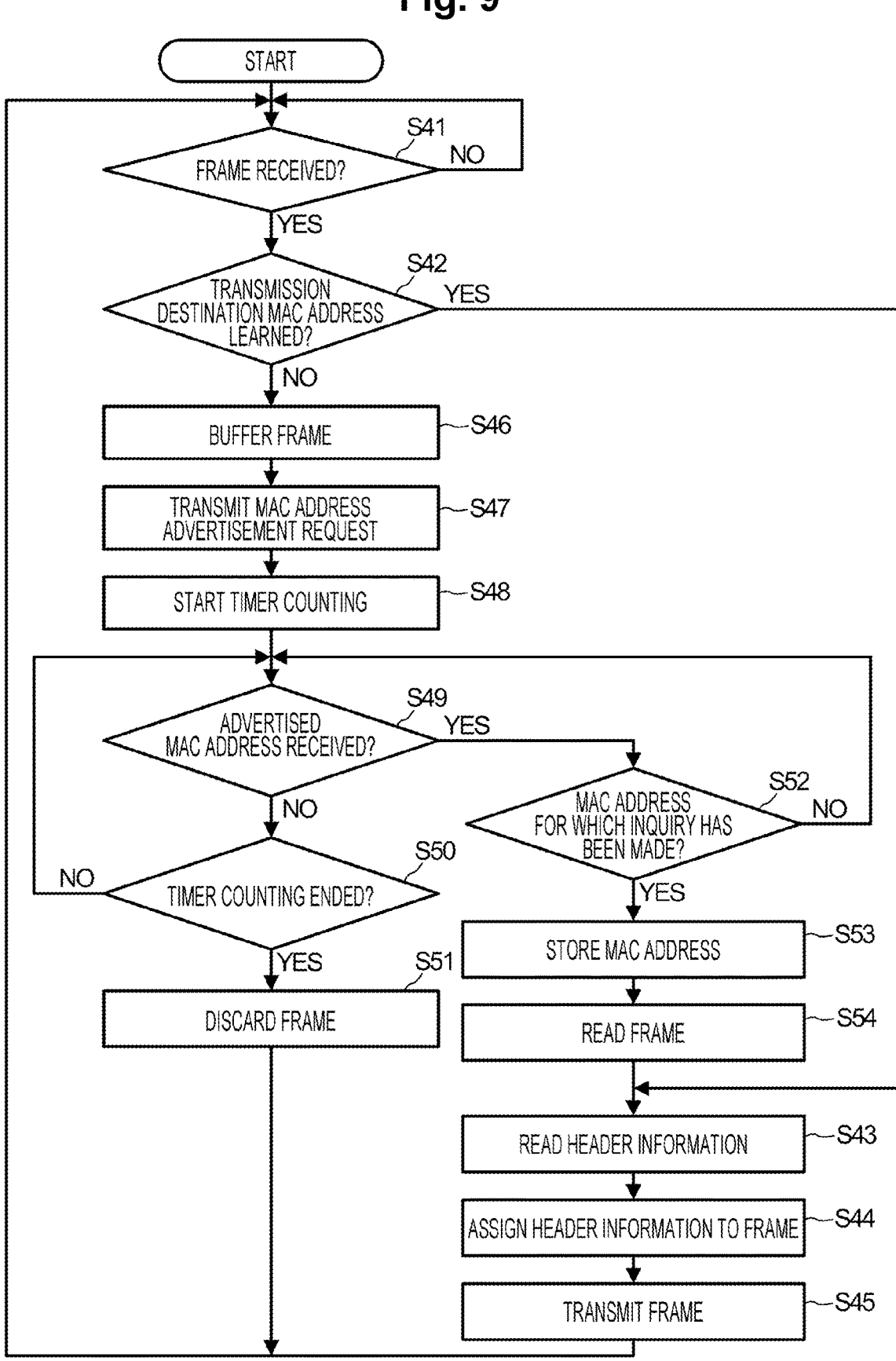
FIG. 9 is a flowchart illustrating an example of an operation of a communication apparatus in a case where the communication apparatus according to the third embodiment is an inquiry source for a MAC address.
Figure 10:
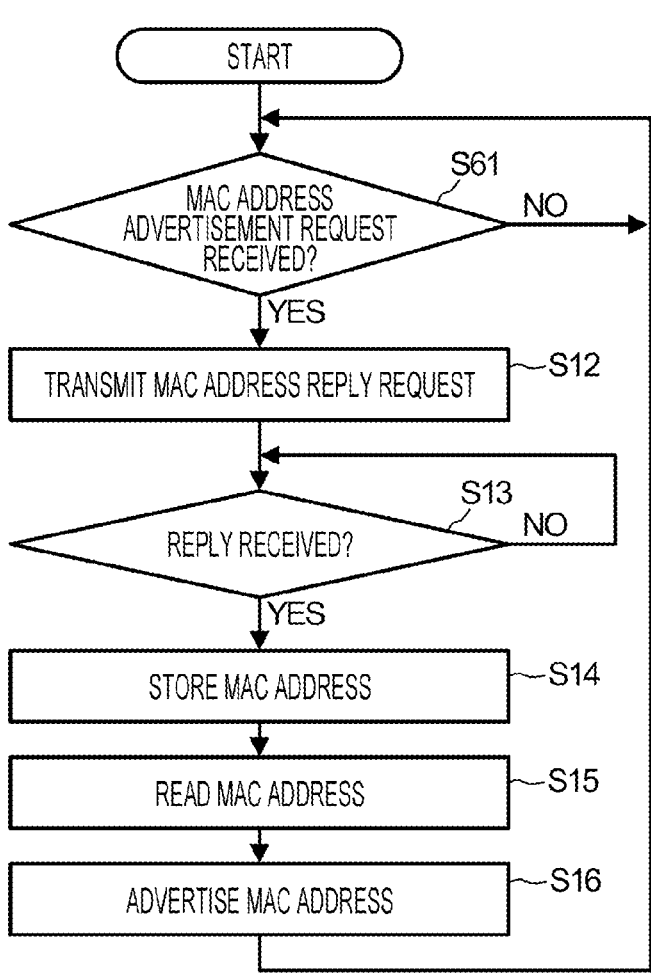
FIG. 10 is a flowchart illustrating an example of an operation of a communication apparatus in a case where the communication apparatus according to the third embodiment is an inquiry destination for a MAC address.

FIG. 9 is a flowchart illustrating an example of an operation of a communication apparatus CA in a case where the communication apparatus CA according to the third embodiment is an inquiry source for a MAC address. Further, FIG. 10 is a flowchart illustrating an example of an operation of a communication apparatus CA in a case where the communication apparatus CA according to the third embodiment is an inquiry destination for a MAC address.

As illustrated in FIG. 9, the processor 1 of the communication apparatus CA, which is an inquiry source, functions as the MAC address identification function unit 20, and determines whether or not the user data frame from the user apparatus UA has been received through the access port 11 of the first communication interface 4 (step S41). In a case where it is determined that the user data frame has not been received (NO in step S41), the processor 1 repeats the processing operation of step S41 described above.

Then, when determining that the user data frame has been received (YES in step S41), the processor 1 determines whether or not the transmission destination MAC address of the user data frame has been learned in the address database 15 (step S42).

When determining that it has been learned (YES in step S42), the processor 1 reads the header information corresponding to the destination MAC address from the address database 15 (step S43). The processor 1 assigns the read header information to the user data frame (step S44). Then, the processor 1 unicasts the user data frame to which the header information has been assigned to the WAN port 12 of the second communication interface 5, and transmits the user data frame to the communication apparatus CA corresponding to the destination user apparatus UA (step S45). Thereafter, the processor 1 proceeds to the processing operation of step S41 described above.

Further, when determining in step S42 described above that the transmission destination MAC address of the user data frame is unlearned (NO in step S42), the processor 1 functions as the buffer function unit 21 to buffer the received user data frame in a temporary storage area provided in the data memory 3 (step S46).

Then, the processor 1 functions as the MAC address advertisement reception function unit 17, and transmits a MAC address advertisement request for requesting advertisement of the MAC address of the user apparatus UA newly installed for the other communication apparatus CA from the WAN port 12 of the second communication interface 5 to the other communication apparatus CA (step S47).

Further, the processor 1 functions as the timer function unit 19 and starts timer counting for clocking the predetermined standby time (step S48).

Thereafter, the processor 1 functions as the MAC address advertisement reception function unit 17, and determines whether or not the new MAC address advertised by the other communication apparatus CA has been received from the WAN port 12 of the second communication interface 5 (step S49). When determining that the advertised new MAC address has not been received (NO in step S49), the processor 1 functions as the timer function unit 19 and the buffer function unit 21, and determines whether or not the timer counting has ended, that is, whether or not the predetermined standby time has been clocked (step S50). In a case where it is determined that the timer counting has not been ended (NO in step S50), the processor 1 proceeds to the processing operation of step S49 described above.

When determining that the timer counting has ended (YES in step S50), the processor 1 functions as the discard function unit 22 and discards the buffered user data frame (step S51). Then, the processor 1 proceeds to the processing operation of step S41 described above.

As illustrated in FIG. 10, the processor 1 of the other communication apparatus CA, which is an inquiry destination, functions as the MAC address acquisition function unit 14, and determines whether or not the MAC address advertisement request from the communication apparatus CA, which is an inquiry source, has been received through the WAN port 12 of the second communication interface 5 (step S61). In a case where it is determined that the MAC address advertisement request has not been received (NO in step S61), the processor 1 repeats the processing operation of this step S61.

On the other hand, when determining that the MAC address advertisement request has been received (YES in step S61), the processor 1 transmits a MAC address reply request by polling from the access port 11 of the first communication interface 4 as in the second embodiment described above (step S12). Then, the processor 1 proceeds to the processing operation of step S13 described above, and waits for reception of a reply from the newly installed user apparatus UA.

Thereafter, when determining that the reply from the new user apparatus UA has been received (YES in step S13), the processor 1 stores the received MAC address of the new user apparatus UA in the address database 15 (step S14). Then, the processor 1 functions as the MAC address advertisement function unit 16, reads the MAC address from the address database 15 (step S15), and advertises the read MAC address onto the network NW from the WAN port 12 of the second communication interface 5 (step S16). Thereafter, the processor 1 proceeds to the processing operation of step S61 described above.

When the processor 1 of the communication apparatus CA, which is an inquiry source, executes the processing operation as the MAC address advertisement reception function unit 17 and determines that the advertised new MAC address has been received in step S49 described above (YES in step S49), the processor 1 determines whether or not the received new MAC address is the MAC address for which an inquiry has been made (step S52). Then, when determining that the received MAC address is not the MAC address for which an inquiry has been made (NO in step S52), the processor 1 proceeds to the processing operation of step S49 described above and waits for reception of the new MAC address advertised from another communication apparatus CA.

On the other hand, when determining that the received MAC address is the MAC address for which an inquiry has been made (YES in step S52), the processor 1 pairs the received MAC address of the new user apparatus UA with the device ID of the communication apparatus CA, and stores the pair in the address database 15 (step S53). Then, the processor 1 functions as the buffer function unit 21 and the header assignment function unit 18, reads the buffered user data frame (step S54), proceeds to the processing operation of step S43 described above, and reads the header information corresponding to the destination MAC address from the address database 15.

Note that, in a case where the communication apparatus CA, which is an inquiry destination, does not receive a reply from the newly installed user apparatus UA even after the predetermined standby time has elapsed in step S13 described above, that is, in a case where there is no newly installed user apparatus UA, reply information indicating that fact may be transmitted to the communication apparatus CA, which is an inquiry source.

In the third embodiment as described above, for example, in the communication system as illustrated in FIG. 5, when the first communication apparatus CA1, which is an inquiry source, receives the user data frame addressed to, for example, the fourth user apparatus UA4 from the first user apparatus UA1, the first communication apparatus CA1 determines whether or not the destination MAC address of the received user data frame has been learned. Then, when recognizing that it is unlearned, the first communication apparatus CA1 buffers the user data frame and inquires of the second and third communication apparatuses CA2 and CA3, which are other communication apparatuses, about a new MAC address. When receiving the inquiry, the second and third communication apparatuses CA2 and CA3 transmit a reply request to the user apparatus UA by polling.

For example, when the second communication apparatus CA2 acquires the MAC address using the reply from the newly installed fourth user apparatus UA4, the fact that there is new installation and the MAC address are advertised to the first and third communication apparatuses CA1 and CA3, which are the other communication apparatuses. As a result, not only the first communication apparatus CA1 but also the third communication apparatus CA3 can perform MAC address learning.

Further, the third communication apparatus CA3, since there is no newly installed user apparatus UA and there is no reply, returns the fact that there is no new installation to the first communication apparatus CA1. Note that such a return indicating the absence of new installation is not necessarily required. Since the timeout function is provided in the first communication apparatus CA1, the first communication apparatus CA1 can determine that there is no new installation since there is no reply from the third communication apparatus CA3 within a prescribed period.

As described above, in the communication apparatus CA according to the third embodiment, the MAC address acquisition function unit 14 receives the MAC address advertisement request signal SG23 as a request for acquiring the MAC address of the newly connected user apparatus UA transmitted via the network NW, and acquires the MAC address of the newly connected user apparatus UA. As described above, the MAC address acquisition function unit 14, in response to reception of the request for advertisement of the MAC address from the communication apparatus CA, which is an inquiry source, can transmit the MAC address acquisition request to the user apparatus UA through the access port 11, acquire the MAC address, and advertise the MAC address to the other communication apparatus CA through the network NW. Thus, the communication apparatus CA, which is an inquiry source, can perform MAC address learning and transfer the buffered user data frame. Accordingly, in the communication apparatus CA, which is an inquiry source, the MAC address learning can be performed for the newly installed user apparatus UA at the time point when the MAC address is required, that is, at an appropriate time point.

That is, the communication system according to the present embodiment includes the MAC address identification function unit 20 that, when the communication apparatus CA, which is a transmission device, receives, from the transmission source user apparatus UA via the access port 11, the user data to be transmitted to the transmission destination user apparatus UA, identifies whether the MAC address of the transmission destination user apparatus UA has been learned, and the MAC address advertisement reception function unit 17, which is a request function unit, that, when the MAC address identification function unit 20 identifies that the MAC address has not been learned, transmits the MAC address advertisement information signal SG10 as a request for acquiring the MAC address of the user apparatus UA newly connected to the access port 11 of the communication apparatus CA to the communication apparatus CA, which is a reception device, via the network NW. Further, the communication apparatus CA, which is a reception device, includes the MAC address acquisition function unit 14, which is an acquisition function unit, that confirms, in response to reception of the MAC address advertisement request signal SG23 as a request for acquiring the MAC address of the user apparatus UA newly connected via the network NW, the presence of absence of new connection of the user apparatus UA under the access port 11 and acquires the MAC address from the user apparatus UA that has been newly connected, and the MAC address advertisement function unit 16, which is an advertisement function unit, that advertises the acquired MAC address to the communication apparatus CA, which is a transmission device, via the network NW. As described above, when the communication apparatus CA, which is a transmission device, receives the user data frame having the unlearned MAC address as the destination from the user apparatus UA, the communication apparatus CA inquires of the other communication apparatus CA about the MAC address, that is, transmits a request for advertisement of the MAC address to the other communication apparatus CA. The MAC address acquisition function unit 14 of the communication apparatus CA, which is a reception device, in response to reception of the request for advertisement of the MAC address from the communication apparatus CA, which is a transmission device, transmits the MAC address acquisition request to the user apparatus UA through the access port 11, and acquires the MAC address. Then, the MAC address advertisement function unit 16 advertises the MAC address from the WAN port 12 to the other communication apparatus CA via the network NW. As a result, the communication apparatus CA, which is a transmission device, can perform MAC address learning and transfer the buffered user data. Thus, in the communication apparatus CA, which is a transmission device, the MAC address learning can be performed for the newly installed user apparatus UA at the time point when the MAC address is required, that is, at an appropriate time point.

Fourth Embodiment

Next, the fourth embodiment of this invention will be described. In the description of the fourth embodiment, the same configurations and processing operations as those of the third embodiment described above are denoted by the same reference numerals as those used in the description of the third embodiment described above, and the description thereof will be omitted.
(Configuration)

Figure 11:
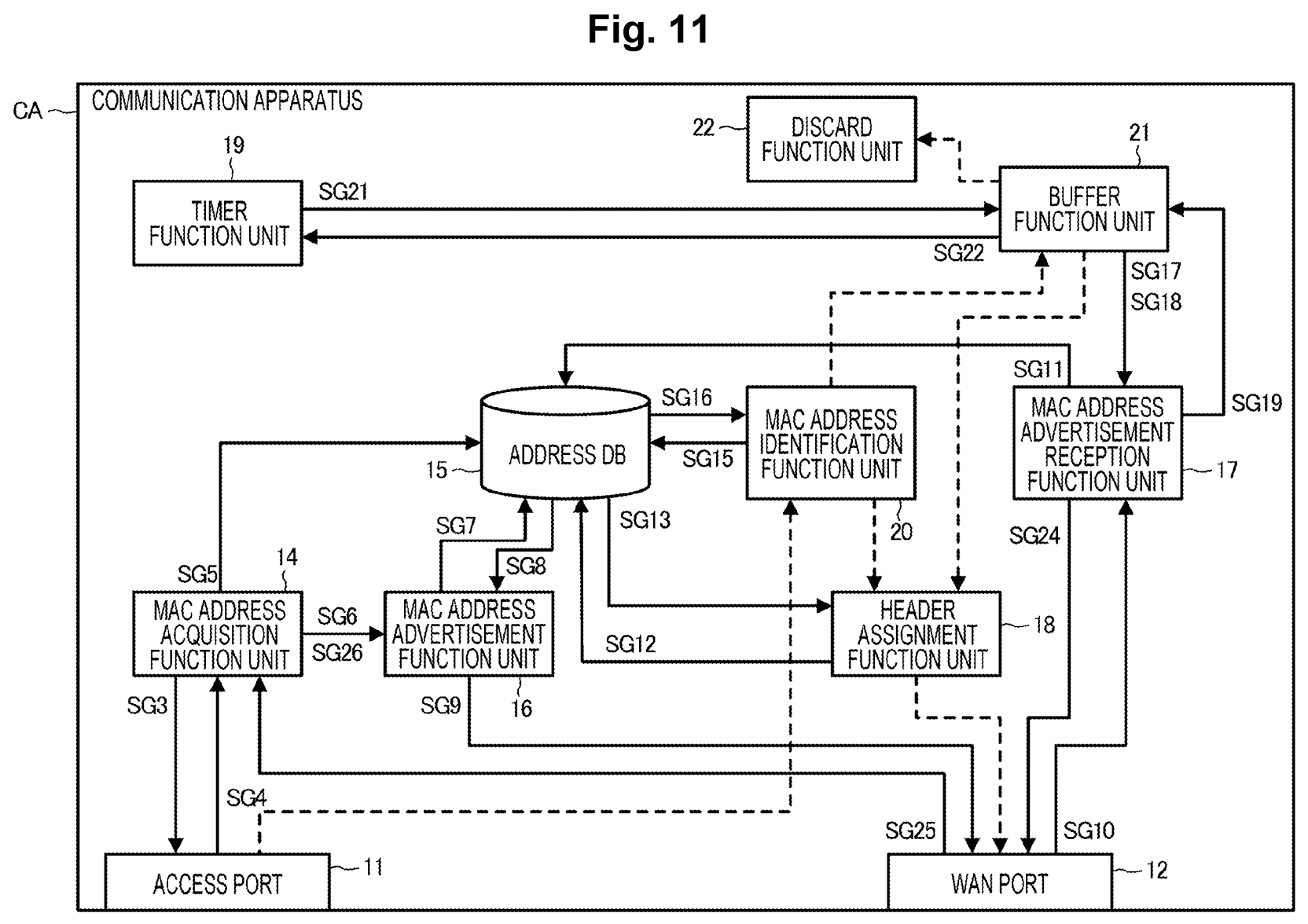

FIG. 11 is a block diagram illustrating an example of a configuration of a communication apparatus CA according to the fourth embodiment of this invention. In the communication apparatus CA according to the present embodiment with the same configuration as that of the third embodiment, the MAC address advertisement reception function unit 17 transmits a MAC address advertisement request signal with MAC address notification SG24 to the WAN port 12 instead of the MAC address advertisement request signal SG22. As described above, in the present embodiment, the communication apparatus CA, which is an inquiry source, designates a MAC address to be advertised when requesting advertisement of a new MAC address.

Thus, a signal transmitted from the WAN port 12 to the MAC address acquisition function unit 14 also becomes a MAC address advertisement request signal with MAC address notification SG25 instead of the MAC address advertisement request signal SG23. Then, the MAC address acquisition function unit 14 transmits the MAC address a notification of which has been given by the MAC address advertisement request signal with MAC address notification SG25 to the MAC address advertisement function unit 16 as a MAC address notification signal SG26.
(Operation)

Next, the operation of the communication apparatus CA according to the fourth embodiment will be described.

The operation of the communication apparatus CA, which is an inquiry source, is similar to that described with reference to the flowchart of FIG. 9 in the third embodiment except that the MAC address advertisement request with MAC address notification is transmitted instead of transmission of the MAC address advertisement request in step S47 described above.

Figure 12:
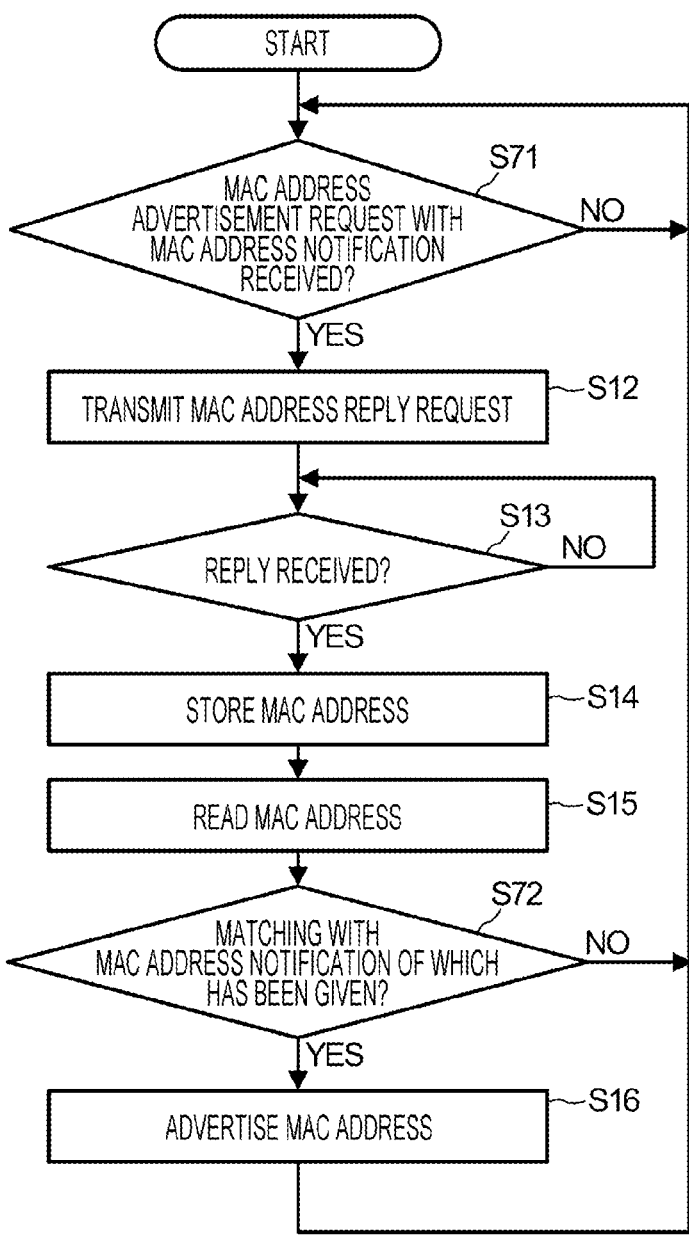
FIG. 12 is a flowchart illustrating an example of an operation of a communication apparatus in a case where the communication apparatus according to the fourth embodiment is an inquiry destination for a MAC address.

FIG. 12 is a flowchart illustrating an example of an operation of a communication apparatus CA in a case where the communication apparatus CA according to the fourth embodiment is an inquiry destination for a MAC address. The processor 1 of the communication apparatus CA, which is an inquiry destination, functions as the MAC address acquisition function unit 14, and determines whether or not the MAC address advertisement request with MAC address notification from the communication apparatus CA, which is an inquiry source, has been received through the WAN port 12 of the second communication interface 5 (step S71). In a case where it is determined that the MAC address advertisement request with MAC address notification has not been received (NO in step S71), the processor 1 repeats the processing operation of this step S71.

On the other hand, when determining that the MAC address advertisement request with MAC address notification has been received (YES in step S71), the processor 1 transmits a MAC address reply request by polling from the access port 11 of the first communication interface 4 as in the second embodiment described above (step S12). Then, the processor 1 proceeds to the processing operation of step S13 described above, and waits for reception of a reply from the newly installed user apparatus UA.

Thereafter, when determining that the reply from the new user apparatus UA has been received (YES in step S13), the processor 1 stores the received MAC address of the new user apparatus UA in the address database 15 (step S14). Then, the processor 1 functions as the MAC address advertisement function unit 16, reads the MAC address from the address database 15 (step S15), and determines whether or not the MAC address matches the MAC address a notification of which has been given from the communication apparatus CA, which is an inquiry source (step S72). In a case where it is determined that it does not match the MAC address a notification of which has been given (NO in step S72), the processor 1 proceeds to the processing operation of step S71 described above. Note that, at this time, the processor 1 may return, to the communication apparatus CA, which is an inquiry source, the fact that there is no new installation of the user apparatus UA of the corresponding MAC address.

When determining that it matches the MAC address a notification of which has been given (YES in step S72), the processor 1 advertises the read MAC address described above onto the network NW from the WAN port 12 of the second communication interface 5 (step S16). Thereafter, the processor 1 proceeds to the processing operation of step S71 described above.

As described above, in the communication apparatus CA according to the fourth embodiment, the MAC address advertisement reception function unit 17, which is a request function unit, of the communication apparatus CA, which is a transmission device, transmits the MAC address advertisement request signal with MAC address notification SG24 as a request for acquiring a specific MAC address, which is a transmission destination of user data, among the MAC addresses of the newly connected user apparatuses UA, the MAC address acquisition function unit 14 of the communication apparatus CA, which is a reception device, sends the specific MAC address in the MAC address advertisement request signal with MAC address notification SG25 to the MAC address advertisement function unit 16 as the MAC address notification signal SG26 in addition to the MAC address acquired from the newly connected user apparatus UA in response to the reception of the MAC address advertisement request signal with MAC address notification SG25, and the MAC address advertisement function unit 16 determines whether the MAC address acquired by the MAC address acquisition function unit 14 is the specific MAC address, and when the acquired MAC address is the specific MAC address, advertises the acquired MAC address. As described above, the MAC address acquisition function unit 14 of the communication apparatus CA, which is a reception device, receives the MAC address notification from the communication apparatus CA, which is a transmission device, and the MAC address acquisition function unit 14 determines whether the MAC address replied from the user apparatus UA matches the MAC address for which an inquiry has been made, and when the MAC addresses match, advertises the MAC address. As a result, the communication apparatus CA, which is a transmission device, can perform MAC address learning and transfer the buffered user data frame. Thus, in the communication apparatus CA, which is a transmission device, the MAC address learning can be performed for the user apparatus UA newly installed for the other communication apparatus CA, which is a reception device, at the time point when the MAC address is required, that is, at an appropriate time point.

Note that the MAC address acquisition function unit 14 of the communication apparatus CA, which is a reception device, may be configured to request a reply only in a case corresponding to the specific MAC address a notification of which has been given from the communication apparatus CA, which is an inquiry source, when transmitting the MAC address reply request to the user apparatus UA. As a result, the matching determination in the MAC address advertisement function unit 16 can be omitted.

Fifth Embodiment

Next, the fifth embodiment of this invention will be described.

Figure 13:
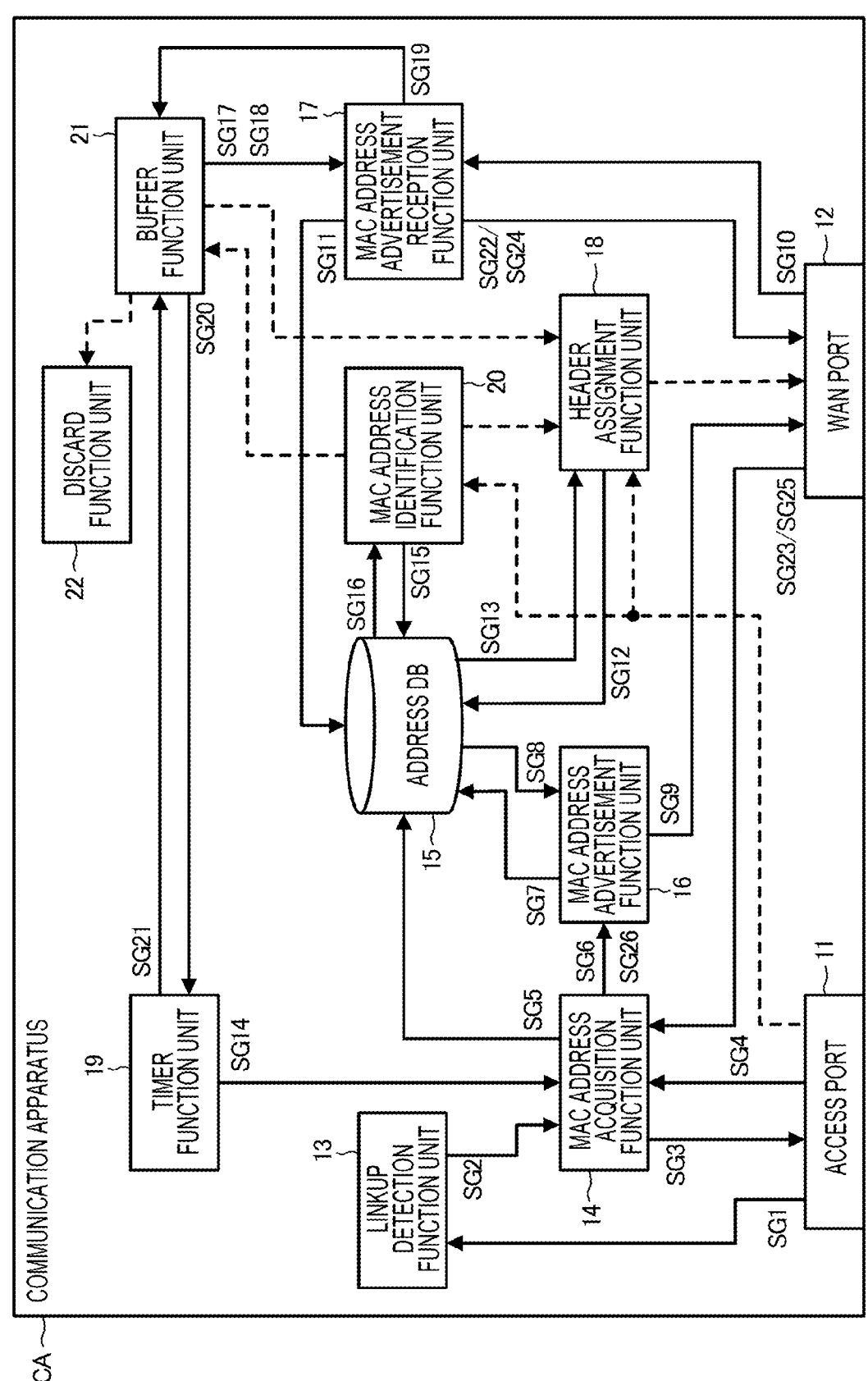
FIG. 13 is a block diagram illustrating an example of a configuration of a communication apparatus according to a fifth embodiment of this invention.

FIG. 13 is a block diagram illustrating an example of a configuration of a communication apparatus CA according to the fifth embodiment of this invention. As illustrated in the drawing, the communication apparatus CA according to the present embodiment is a combination of the communication apparatuses according to the first to fourth embodiments.

As described above, by combining the first to fourth embodiments described above, it is possible to perform MAC address learning for the newly installed user apparatus UA before the time point when the MAC address is required and at the time point when the MAC address is required, that is, at an appropriate time point.

Note that, although the first to fourth embodiments described above are combined here, it is a matter of course that two or more of the first to fourth embodiments described above may be combined instead of all of them.

Application Examples

Figure 14:
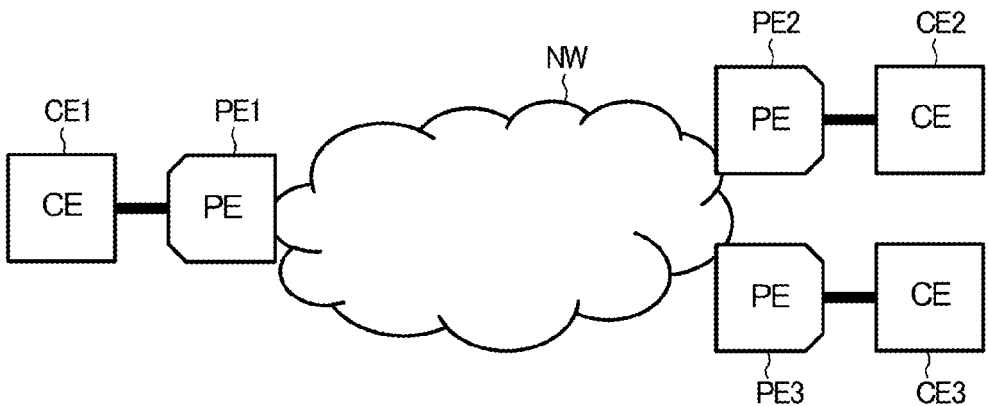
FIG. 14 is a schematic diagram for describing an EVPN communication system.

The communication apparatus CA according to the first to fifth embodiments described above can be applied to various communication systems. Hereinafter, some application examples will be described.
[EVPN]
FIG. 14 is a schematic diagram for describing an EVPN communication system. The EVPN communication system includes a provider edge PE installed in a network NW, which is a provider-side network, and a customer edge CE installed in a customer-side network such as a LAN. In the example of FIG. 14, a first provider edge PE1 and a first customer edge CE1 installed in a first base, a second provider edge PE2 and a second customer edge CE2 installed in a second base, and a third provider edge PE3 and a third customer edge CE3 installed in a third base are included.

For example, when receiving a signal from the second customer edge CE2, the second provider edge PE2 of the second base performs the MAC address learning, and advertises a MAC/IP Route in the form of Route Type 2 to the first provider edge PE1 and the third provider edge PE3, which are the provider edges PE of the other bases. Then, the first provider edge PE1 and the third provider edge PE3 that have received the MAC/IP Route perform the MAC address learning for the second customer edge CE2 connected to the second provider edge PE2, which is a provider edge PE other than the own apparatuses on the basis of the MAC/IP Route.

In such an EVPN communication system, when the MAC address learning has been performed, the Unicast communication is transferred only to an appropriate provider edge PE. For example, when the first provider edge PE1 of the first base receives a signal whose destination MAC address is the second customer edge CE2 of the second base and the MAC address of the second customer edge CE2 has been learned, the first provider edge PE1 can transfer the signal to the second provider edge PE2 since it is known that the second customer edge CE2 is connected under the second provider edge PE2 of the second base.

However, when the MAC address is not learned, since the transmission source provider edge PE cannot determine under which provider edge PE the destination customer edge CE is connected, the UNICAST communication is transferred to all the provider edges PE in the same domain as Unknown Unicast communication. For example, when the first provider edge PE1 of the first base receives a signal whose destination MAC address is the second customer edge CE2 of the second base and the MAC address of the second customer edge CE2 has not been learned, since it is unknown that the second customer edge CE2 is connected under the second provider edge PE2 of the second base, the signal is transferred to the second provider edge PE2 and the third provider edge PE3, which are all the provider edges PE in the same domain.

Accordingly, in the EVPN communication system, when the frequency of data communication from the customer edge CE is low and there are many unlearned MAC addresses, there is a problem that Unknown Unicast communication frequently occurs and the bandwidth of the network NW is squeezed.

Figure 15:
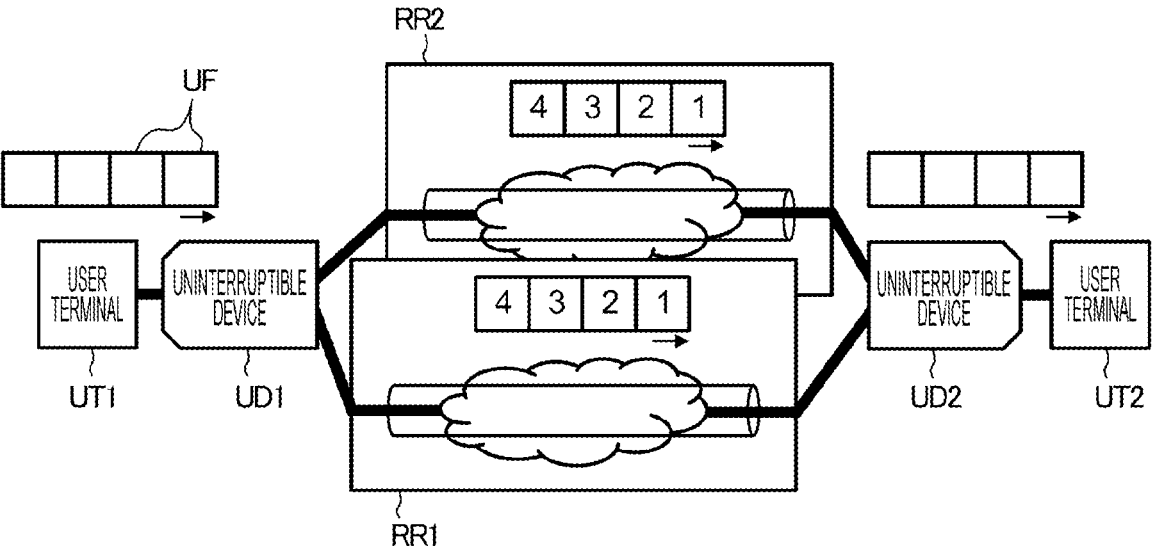
FIG. 15 is a schematic diagram for describing an uninterrupted redundancy switching communication system.

By applying the configuration of the communication apparatus CA according to any of the first to fifth embodiments to each provider edge PE, the MAC address learning can be performed at an appropriate time point, so that such a problem can be solved.
[Uninterrupted Redundancy Switching]
FIG. 15 is a schematic diagram for describing an uninterrupted redundancy switching communication system. The uninterrupted redundancy switching communication system includes a first uninterruptible device UD1, which is a transmission device, a second uninterruptible device UD2, which is a reception device, and a first relay route RR1 and a second relay route RR2, which are two relay routes provided therebetween. The first relay route RR1 is a part of a first relay network, and the second relay route RR2 is a part of a second relay network. A first user terminal UT1 that inputs a user data frame UF, which is a signal to be transmitted, to the first uninterruptible device UD1, which is a transmission device, is connected to the first uninterruptible device UD1. The user data frame UF includes, for example, a header and a data payload. Further, a second user terminal UT2 to which the user data frame UF received from the second uninterruptible device UD2 is input is connected to the second uninterruptible device UD2, which is a reception device.

The first uninterruptible device UD1, which is a transmission device, assigns a sequence number indicating the order to the input user data frame UF, duplicates the user data frame UF according to the number of relay routes RR, and sends the user data frame UF to each relay route RR. In FIG. 15, the numbers illustrated in the squares representing the user data frame UF represent sequence numbers. The second uninterruptible device UD2, which is a reception device, selects the user data frame UF to be output to the second user terminal UT2 according to the timing of reception of the user data frame UF via each relay route RR. For example, the second uninterruptible device UD2 determines the user data frame UF that has arrived earlier on the basis of the sequence number assigned to each user data frame UF received via each relay route RR, deletes the sequence number from the user data frame UF that has arrived earlier, and outputs the user data frame UF to the second user terminal UT2. The second uninterruptible device UD2 discards the user data frame UF that has arrived later. Note that the second uninterruptible device UD2 holds the sequence number of the user data frame UF to be processed next in the form of an expected number. When the user data frame UF having a number different from the expected number arrives, the communication without skipping the order of the user data frames UF is realized by waiting until the user data frame UF having the expected number arrives.

Figure 16:
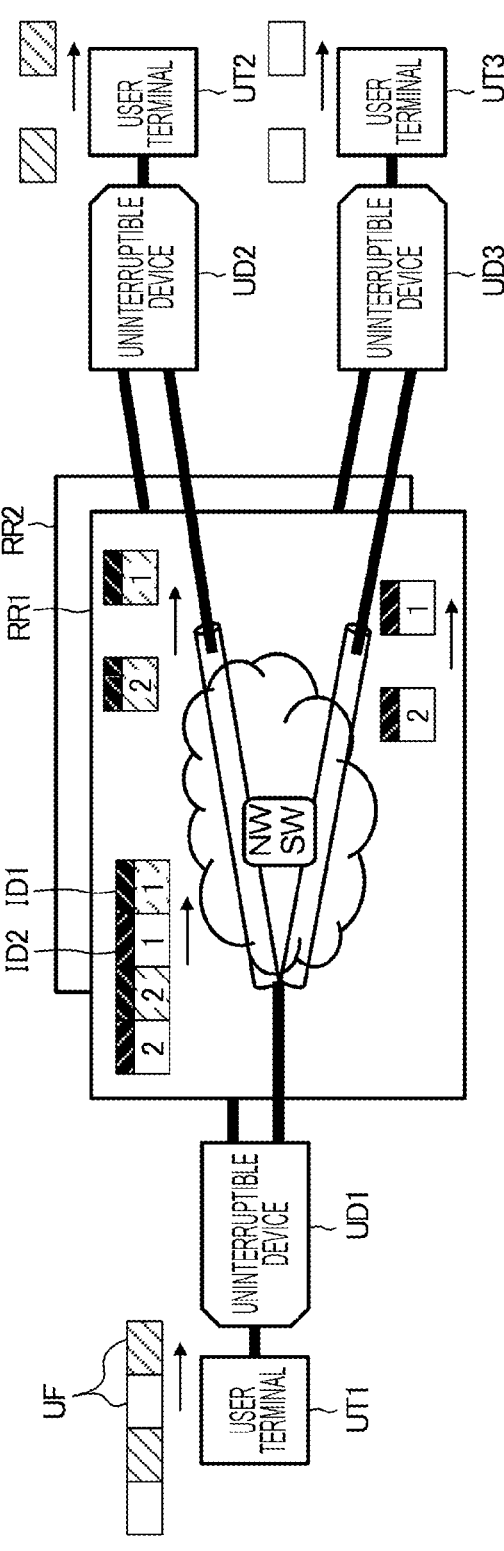
FIG. 16 is a schematic diagram for describing an uninterrupted redundancy switching communication system in a case of supporting multiple bases.

FIG. 16 is a schematic diagram for describing an uninterrupted redundancy switching communication system in a case of supporting multiple bases. The uninterrupted redundancy switching communication system in this case includes two uninterruptible devices, that is, a second uninterruptible device UD2 and a third uninterruptible device UD3, as the uninterruptible devices, which are reception devices, with respect to a first uninterruptible device UD1, which is one transmission device. Further, a network switch NWSW is disposed in each relay route RR. The network switch NWSW transfers the user data frame UF addressed to a second user terminal UT2 and the user data frame UF addressed to a third user terminal UT3 sent from the first uninterruptible device UD1, which is a transmission device, only to the uninterruptible device UD connected to the corresponding user terminal UT by learning the Ethernet MAC address.

In such one-to-many communication, when the first uninterruptible device UD1, which is a transmission device, assigns a sequence number to the user data frames UF addressed to the second user terminal UT2 and the third user terminal UT3 without distinguishing the destinations as in the case of one-to-one communication, and sends the user data frame UF to each of the relay routes RR1 and RR2, the problem described below occurs. That is, in this case, the network switch NWSW of the network including the relay route RR transfers the user data frame UF addressed to the second user terminal UT2 and the user data frame UF addressed to the third user terminal UT3 only to the uninterruptible device UD connected to the corresponding user terminal UT by learning the Ethernet MAC address. At this time, discontinuity occurs in sequence numbers. In the case where there is discontinuity in the sequence numbers of the received series of user data frames UF, the uninterruptible devices UD2 and UD3, which are reception devices, wait for the timeout period to receive the user data frame UF with the missing sequence number, and then perform the processing of the next user data frame UF. Therefore, the transfer time of the user data frame UF increases.

Hence, in the multi-base communication, as illustrated in FIG. 16, it is necessary to classify the user data frame UF for each pair of the uninterruptible devices UD on the transmission side and the reception side, and to assign a sequence number and select the user data frame UF for each pair. A logical classification unit by the pair of the transmission/reception uninterruptible devices UD is defined as a traffic flow.

The user data frame UF to be transmitted from the first user terminal UT1, which is a transmission source, to the second user terminal UT2, which is a destination, and the user data frame UF to be transmitted to the third user terminal UT3, which is a destination, are mixed and input to the first uninterruptible device UD1. In FIG. 16, among the user data frames UF, the user data frame UF to the second user terminal UT2 and the user data frame UF to the third user terminal UT3 are illustrated separately by hatching the user data frame UF to the second user terminal UT2.

The first uninterruptible device UD1, which is a transmission device, assigns a sequence number indicating the order to the input user data frame UF, duplicates the user data frame UF according to the number of relay routes RR, and sends the user data frame UF to each relay route RR. In this case, the first uninterruptible device UD1 associates a pair of uninterruptible devices as one traffic flow, and assigns a sequence number to each pair. That is, the first uninterruptible device UD1 assigns sequence numbers 1, 2, ... to the pair of the first uninterruptible device UD1 and the second uninterruptible device UD2, and also assigns sequence numbers 1, 2, ... to the pair of the first uninterruptible device UD1 and the third uninterruptible device UD3. Further, an identifier for identifying a traffic flow is assigned. In the example of FIG. 16, a first identifier ID1 is assigned to the pair of the first uninterruptible device UD1 and the second uninterruptible device UD2, and a second identifier ID2 is assigned to the pair of the first uninterruptible device UD1 and the third uninterruptible device UD3. As the identifier for identifying the traffic flow, a pair of MAC addresses of the user terminals UT of the transmission source and the transmission destination included in the user data frame UF, a pair of device IDs of the uninterruptible devices UD of the transmission source and the transmission destination, and the like are conceivable.

On the basis of the MAC address learning information, the network switch NWSW of each relay route RR transmits the user data frame UF addressed to the user terminal B to the relay route to the second uninterruptible device UD2 and transmits the user data frame UF addressed to the user terminal C to the relay route to the third uninterruptible device UD3, among the user data frames UF transmitted from the first uninterruptible device UD1.

The second uninterruptible device UD2, which is a reception device, classifies the traffic flow according to the identifier for the user data frame UF received via each relay route RR, selects the user data frame UF for each traffic flow, and outputs the user data frame UF to the second user terminal UT2. For example, the second uninterruptible device UD2 determines the user data frame UF that has arrived earlier and addressed to the second user terminal UT2 on the basis of the identifier and the sequence number assigned to each user data frame UF received, deletes the identifier and the sequence number from the user data frame UF that has arrived earlier, and outputs the user data frame UF to the second user terminal UT2. The second uninterruptible device UD2 discards the user data frame UF that has arrived later and to which the same sequence number is assigned.

Similarly, the third uninterruptible device UD3, which is a reception device, receives the user data frame UF via each relay route RR, deletes the sequence number from the user data frame UF that has arrived earlier, and outputs the user data frame UF to the third user terminal UT3. The third uninterruptible device UD3 discards the user data frame UF that has arrived later and to which the same sequence number is assigned.

As a result, there is no skipping, discontinuity, or overlap in sequence numbers, and redundancy switching can be realized without an increase in delay or frame loss.

In such an uninterrupted redundancy switching communication system between multiple bases, the uninterruptible device UD, which is a transmission device, needs to determine the uninterruptible device UD, which is a reception device, from the MAC address of the user terminal UT, which is a transmission destination, and classify the traffic flow. Therefore, it is necessary to learn the MAC address of the transmission destination user terminal UT and the transmission destination uninterruptible device UD in association with each other. By applying the configuration of the communication apparatus CA according to the first or second embodiment to each uninterruptible device UD, the MAC address learning can be performed before the time point when the MAC address is required.

For example, by receiving the user data frame UF from the second user terminal UT2 of the second base, the second uninterruptible device UD2 advertises the MAC/IP Route to the first and third uninterruptible devices UD1 and UD3 of the first and third bases. As a result, the first and third uninterruptible devices UD1 and UD3 can learn the second uninterruptible device UD2 and the MAC address of the second user terminal UT2 in association with each other. Similarly, the third uninterruptible device UD3 of the third base receives the user data frame UF from the third user terminal UT3, and advertises the MAC/IP Route to the first and second uninterruptible devices UD1 and UD2 of the first and second bases. As a result, the first and second uninterruptible devices UD1 and UD2 can learn the third uninterruptible device UD3 and the MAC address of the third user terminal UT3 in association with each other. Then, when the user data frame UF whose destination MAC address is the second user terminal UT2 and the user data frame UF whose destination MAC address is the third user terminal UT3 are received from the first user terminal UT1, the first uninterruptible device UD1 classifies the traffic flows corresponding to the respective user data frames UF from prior learning information. Then, an identifier and a sequence number are assigned to the user data frame UF for each pair of transmission and reception uninterruptible devices, and transfer is performed. As a result, it is possible to realize uninterrupted redundancy switching that performs identification in units of uninterruptible devices between multiple bases.

As described above, when the MAC address learning is performed in advance, an appropriate traffic flow can be identified, but a problem occurs when the MAC address learning is not completed in advance in the uninterruptible device UD, which is a transmission device. Specifically, in the case of unlearning, a correct traffic flow cannot be identified in the uninterruptible device UD, and transfer is performed with the traffic flow as Unknown Unicast communication similar to that of Broadcast/Unknown unicast/Multicast (BUM). Then, when the MAC address learning of the destination user terminal UT is performed in the middle of communication, Unicast communication is performed from that timing, and identification is performed with the correct traffic flow, so that discontinuity occurs in the sequence numbers. As a result, inappropriate delay increases.

Hence, it is desirable that the configuration of the communication apparatus CA according to any of the third to fifth embodiments is applied to each uninterruptible device UD to perform MAC address learning at a time point when the MAC address is required.

Figure 17:
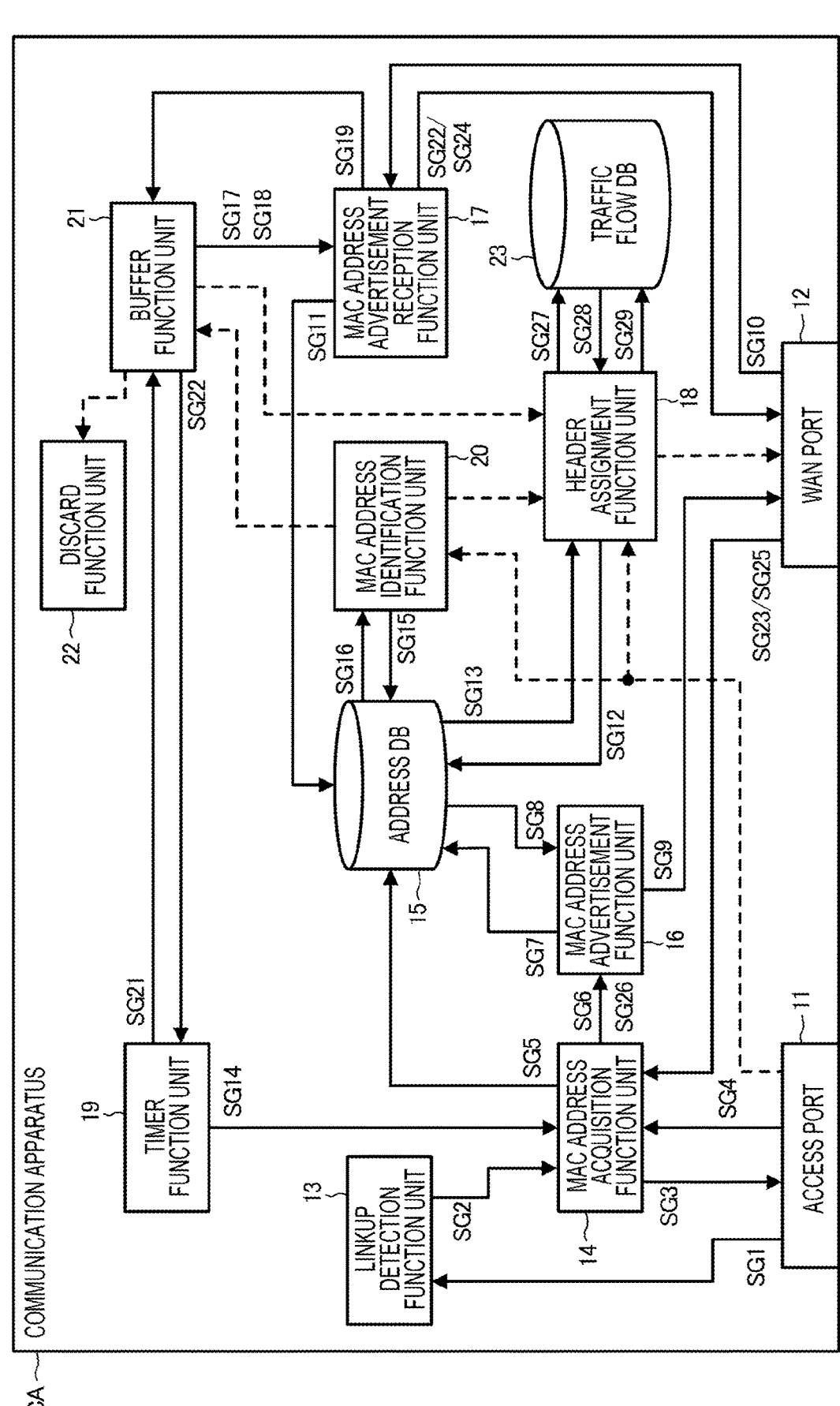
FIG. 17 is a block diagram illustrating an example of a configuration of a communication apparatus to be applied as an uninterruptible device in an uninterrupted redundancy switching communication system.

FIG. 17 is a block diagram illustrating an example of a configuration of a communication apparatus to be applied as an uninterruptible device UD in an uninterrupted redundancy switching communication system. Here, the communication apparatus according to the fifth embodiment is taken as an example, but the configuration of the communication apparatus according to another embodiment may be used.

The communication apparatus CA serving as the uninterruptible device UD in this case includes a traffic flow database (in FIG. 17, referred to as a traffic flow DB) 23. The traffic flow database 23 stores traffic flow information indicating the identifier and the already-assigned sequence number for the traffic flow of the pair of communication apparatuses CA.

When receiving a series of user data in which user data frames having different destinations are mixed from the access port 11, the header assignment function unit 18 requests reading of the header information including the MAC address of the user terminal UT, which is a destination, with respect to the address database 15 for each user data frame. As a result, a notification of the header information including the MAC address of the destination user terminal UT and the device ID of the communication apparatus CA is given from the address database 15.

Further, the header assignment function unit 18 transmits a traffic flow information read request signal SG27 for requesting reading of the traffic flow information to the traffic flow database 23 on the basis of the header information. In response to this, the traffic flow database 23 transmits the stored traffic flow information to the header assignment function unit 18 as a traffic flow information notification signal SG28. The header assignment function unit 18 classifies to which traffic flow each user data frame corresponds on the basis of the traffic flow information indicated by the traffic flow information notification signal SG28.

When there is already a traffic flow of the pair of corresponding communication apparatuses, the header assignment function unit 18 assigns an identifier used by the traffic flow and a new sequence number as a header to the user data frame. Further, when there is no traffic flow of the pair of corresponding communication apparatuses yet, the header assignment function unit 18 assigns an identifier indicating a new traffic flow and a new sequence number to the user data frame as a header. Then, the header assignment function unit 18 transmits a traffic flow notification signal SG29 indicating the traffic flow information indicating the identifier and the new sequence number assigned to the header to the traffic flow database 23. The traffic flow database 23 stores traffic flow information on the basis of the traffic flow notification signal SG29.

Further, the header assignment function unit 18 duplicates the user data frame to which the header has been assigned according to the number of relay routes RR, transfers the user data frame to the WAN port 12, and transmits the user data frame.

As described above, the first to fifth embodiments can be applied to the uninterrupted redundancy switching communication system including the uninterruptible device UD serving as the communication apparatus CA, which is a transmission device, connected to the user terminal UT, which is a transmission source user apparatus, via the access port 11, and the uninterruptible devices UD serving as a plurality of communication apparatuses CA, which is a plurality of reception devices, connected to the user terminals UT, which are transmission destination user apparatuses, via the access ports 11, in which the uninterruptible device UD, which is a transmission device, duplicates the user data received from the transmission source user terminal UT and transmits the user data to the uninterruptible devices UD, which are reception devices, connected to the transmission destination user terminals UT, which are destinations of the user data, via different relay routes RR. That is, each of the uninterruptible devices UD, which are reception devices, can include the MAC address acquisition function unit 14, which is an acquisition function unit, that acquires the MAC address of the newly connected user terminal UT in response to reception of the request for acquiring the MAC address of the user terminal UT newly connected to the access port 11, and the MAC address advertisement function unit 16, which is an advertisement function unit, that advertises the acquired MAC address to the other uninterruptible devices UD via the plurality of relay routes RR. Further, the uninterruptible device UD, which is a transmission device, can include the MAC address advertisement function unit 16 and the address database 15, which are a learning function unit, that receives and learns the MAC addresses advertised by the respective uninterruptible devices UD, which are a plurality of reception devices, and the header assignment function unit 18 that classifies each user data frame into any one of traffic flows indicating a pair of the uninterruptible device UD, which is a transmission device, and the uninterruptible device UD, which is a reception device, on the basis of the MAC address of the transmission destination user terminal UT, which is a destination, included in the user data frame and the learned MAC address when receiving a series of user data in which user data frames having different destinations are mixed from the transmission source user terminal UT, and assigns a header including a sequence number and an identifier to identify the pair to be assigned to each user data frame to each user data frame for each traffic flow.

OTHER EMBODIMENTS

In the above embodiments, the case where the communication system includes three communication apparatuses CA has been described as an example, but it is a matter of course that the number of communication apparatuses CA may be more than three.

Note that the processing procedures illustrated in the flowcharts are examples, and it goes without saying that they are not limited thereto.

Further, the EVPN and the uninterrupted redundancy switching have been described as application examples, but it is needless to say that it can be applied to other applications.

The method described in each embodiment can be distributed by being stored as a communication program (software means) that can be executed by a computing machine (computer) in, for example, a recording medium such as a magnetic disk (a floppy (registered trademark) disk, a hard disk, or the like), an optical disc (a CD-ROM, a DVD, an MO, or the like), or a semiconductor memory (a ROM, a RAM, a flash memory, or the like) or by transmitted through a communication medium. Note that the program stored on the medium side also include a setting program for configuring, in the computing machine, a software means (including not only an execution program but also tables and data structures) to be executed by the computing machine. The computing machine that implements the present device executes the above-described processing by reading the programs recorded in the recording medium, constructing the software means by the setting program as needed, and controlling the operation by the software means. Note that the recording medium described in the present specification is not limited to a recording medium for distribution, but includes a storage medium such as a magnetic disk or a semiconductor memory provided in the computing machine or in a device connected via a network.

In short, this invention is not limited to the above embodiments, and various modifications can be made in the implementation stage without departing from the gist thereof. Further, each embodiment may be implemented in appropriate combinations if possible, and in such cases, combined effects can be obtained. Furthermore, the above embodiments include inventions at various stages, and various inventions can be extracted by appropriate combinations of a plurality of disclosed components.

REFERENCE SIGNS LIST

1 Processor
2 Program memory
3 Data memory
4 First communication interface
5 Second communication interface
6 Bus
11 Access port
12 WAN port
13 Linkup detection function unit
14 MAC address acquisition function unit
15 Address database
16 MAC address advertisement function unit
17 MAC address advertisement reception function unit
18 Header assignment function unit
19 Timer function unit
20 MAC address identification function unit
21 Buffer function unit
22 Discard function unit
23 Traffic flow database
CA, CA1, CA2, CA3 Communication apparatus
CE1, CE2, CE3 Customer edge
NW Network
NWSW Network switch
PE1, PE2, PE3 Provider edge
RR1, RR2 Relay route
UA, UA1, UA2, UA3, UA4 User apparatus
UD1, UD2, UD3 Uninterruptible device
UT1, UT2, UT3 User terminal

The invention claimed is:

1. A communication apparatus comprising one or more processors configured to:
   receive, from another communication apparatus that is connected to a first user apparatus, a request for acquiring a media access control (MAC) address for a second user apparatus connected to an access port of the communication apparatus;
   in response to receiving the request, acquire the MAC address of the second user apparatus before the time at which the MAC address is required to determine a destination for user data; and advertise the acquired MAC address to the other communication apparatus over a network.

2. The communication apparatus according to claim 1, wherein the one or more processors are further configured to:

detect linkup of the access port; and transmit a notification indicative of the request in response to the linkup of the access port.

3. The communication apparatus according to claim 1, wherein the one or more processors are further configured to:

generate a clock time; and transmit a notification indicative of the request to the acquisition function unit every time a fixed time from the generated clock time elapses.

4. The communication apparatus according to claim 1, wherein the one or more processors are configured to acquire the MAC address of the connected user apparatus in response to receiving the request via the network.

5. A communication system comprising one or more processors configured to:

identify, by a transmission device, whether a MAC address of a transmission destination user apparatus has been learned when user data to be transmitted to the transmission destination user apparatus is received from a transmission source user apparatus via an access port; and in response to identifying that the MAC address is unlearned, transmit, by the transmission device and to a reception device, a request for acquiring a MAC address of a user apparatus newly connected to the access port of the reception device via a network, and confirm, by the reception device, presence or absence of new connection of a user apparatus under the access port in response to reception of the request via the network;

acquire, by the reception device, a MAC address from the newly connected user apparatus before the time at which the MAC address is required to determine a destination for user data; and advertise, to the transmission device, the acquired MAC address via the network.

6. One or more non-transitory computer-readable media that store instructions which, when executed by one or more computer processors, cause the one or more computer processors to perform operations comprising:

receiving, from another communication apparatus that is connected to a first user apparatus, a request for acquiring a media access control (MAC) address for a second user apparatus connected to an access port of the communication apparatus;

in response to receiving the request, acquiring, by one or more processors, the MAC address of the second user apparatus before the time at which the MAC address is required to determine a destination for user data; and advertising, by the one or more processors, the acquired MAC address to the other communication apparatus over a network.

7. The one or more non-transitory computer-readable media of claim 6, further comprising:

detecting linkup of the access port; and transmit a notification indicative of the request in response to the linkup of the access port.

8. The one or more non-transitory computer-readable media of claim 6, further comprising:

generating a clock time; and transmit a notification indicative of the request every time a fixed time from the generated clock time elapses.

9. The one or more non-transitory computer-readable media of claim 6, comprising acquiring the MAC address of the connected user apparatus in response to receiving the request via the network.

\* \* \* \* \*